United States Patent [19]

Sakanishi et al.

[11] Patent Number: 5,587,725
[45] Date of Patent: Dec. 24, 1996

[54] FONT DATA COMPRESSION METHOD IN A CHARACTER GENERATOR

[75] Inventors: Ei Sakanishi, Hachioji; Kiyoshi Kitahara, Naritahigashi, both of Japan

[73] Assignee: Citizen Watch Co., Ltd., Tokyo, Japan

[21] Appl. No.: 304,972

[22] Filed: Sep. 13, 1994

Related U.S. Application Data

[63] Continuation of Ser. No. 699,615, May 15, 1991, abandoned.

[30] Foreign Application Priority Data

May 18, 1990 [JP] Japan ................... 2-126779

[51] Int. Cl.⁶ ....................................... G09G 5/24
[52] U.S. Cl. .................. 345/195; 345/143; 345/202
[58] Field of Search ...................... 345/141, 143, 345/144, 127, 128, 129, 130, 194, 203, 195; 400/121; 382/56; 395/150

[56] References Cited

U.S. PATENT DOCUMENTS

| | | | |
|---|---|---|---|
| 4,181,973 | 1/1980 | Tseng | 345/143 |
| 4,871,270 | 10/1989 | Werbach | 400/121 |
| 4,876,607 | 10/1989 | Tseng | 345/202 |
| 4,881,069 | 11/1989 | Kameda et al. | 340/735 |
| 5,204,756 | 4/1993 | Chevion et al. | 356/462 |

FOREIGN PATENT DOCUMENTS

| | | |
|---|---|---|
| 59-116890 | 7/1984 | Japan . |
| 60-66290 | 4/1985 | Japan . |

OTHER PUBLICATIONS

IBM "Technical Disclosure Bulletin" 1986, pp. 3563–3564.

Primary Examiner—Richard Hjerpe
Assistant Examiner—Regina Liang
Attorney, Agent, or Firm—Lowe, Price, LeBlanc & Becker

[57] ABSTRACT

A font data compression method in a character generator is disclosed. The character generator stores bit patterns for forming a part of dot matrix data based on a specific rule applied to a plurality of font pattern. During regeneration of the font patterns, a whole configuration of the font patterns is automatically regenerated based on the bit patterns for forming a part of the dot matrix data based on the specific rule which have been stored in the character generator.

7 Claims, 16 Drawing Sheets

THE RELATION BETWEEN THE COMPRESSION
INFORMATION AND COMPRESSION PROCESSING

| VALUES OF COMPRESSION INFORMATION 1<br>7 6 5 4 3 2 1 0 BI | CONTENTS OF COMPRESSION INFORMATION | COMPRESSION INFORMATION 2 |
|---|---|---|
| (0 0 0 0 * * * *) | (WHOLE WIDTH DATA WITHOUT COMPRESSION) | NON-EXISTENCE |
| 0 0 0 1 * * * * | REPETITIVE COMPRESSION | NON-EXISTENCE |
| 0 0 1 0 * * * * | MIRROR COMPRESSION | NON-EXISTENCE |
| 1 0 0 0 * * * * | RIGHT-AND-LEFT COMPRESSION | EXISTENCE |
| 1 0 0 1 * * * * | INTER RIGHT-AND-LEFT COMPRESSION | EXISTENCE |
| 1 0 1 0 * * * * | INTER RIGHT-AND-LEFT COMPRESSION MIRROR | EXISTENCE |
| 1 1 0 0 * * * * | RIGHT-AND-LEFT LINKAGE COMPRESSION | EXISTENCE |
| 1 1 0 1 * * * * | INTER RIGHT-AND-LEFT LINKAGE COMPRESSION REPETITION | EXISTENCE |
| 1 1 1 0 * * * * | INTER RIGHT-AND-LEFT LINKAGE COMPRESSION MIRROR | EXISTENCE |
| 1 1 1 1 * * * * | NO DATA | NON-EXISTENCE |

FIG. 2

MEMORY MAP

| ADDRESS | | STRAGE CONTENTS |
|---|---|---|
| 0(16) | | CG ROM IDENTIFYING CODE |
| ↓ | (INDEX PART) | FONT IDENTIFYING CODE, FONT STANDARD BREADTH, FONT DATA TOP ADDRESS |
| | (FONT DATA PART) | COMPRESSION · COMPRESSION · COMPRESSION INFORMATION 1  INFORMATION 2  DATA |
| 7FFF(16) | | |

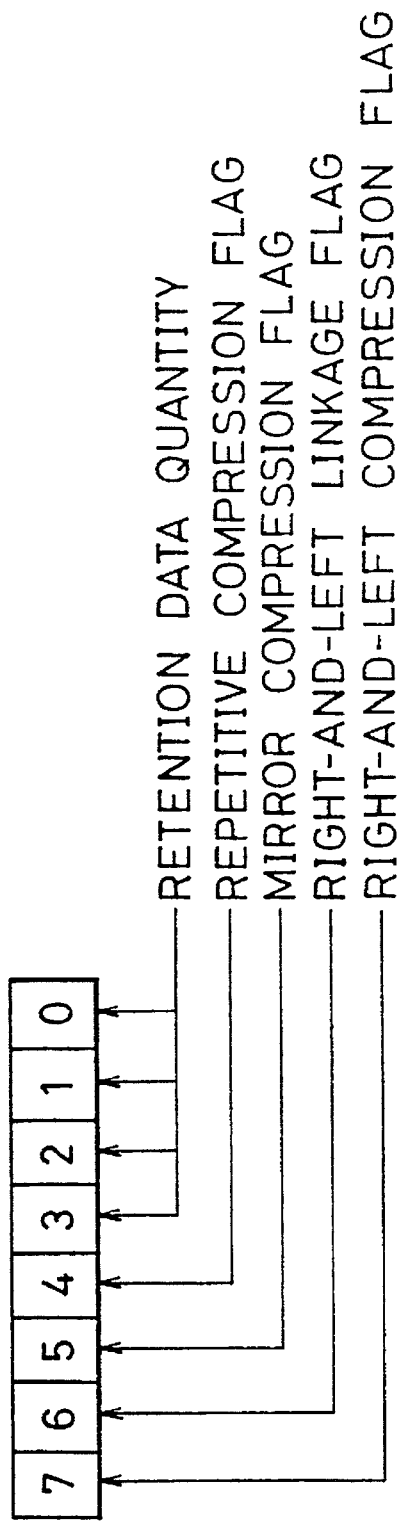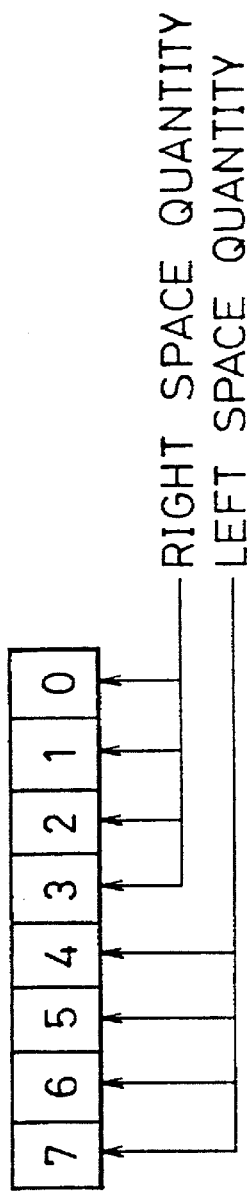

FIG. 5

THE RELATION BETWEEN THE COMPRESSION INFORMATION AND COMPRESSION PROCESSING

| VALUES OF COMPRESSION INFORMATION 1<br>7 6 5 4 3 2 1 0 BI | CONTENTS OF COMPRESSION INFORMATION | COMPRESSION INFORMATION 2 |
|---|---|---|
| (0 0 0 0 * * * *) | (WHOLE WIDTH DATA WITHOUT COMPRESSION) | NON-EXISTENCE |
| 0 0 0 1 * * * * | REPETITIVE COMPRESSION | NON-EXISTENCE |
| 0 0 1 0 * * * * | MIRROR COMPRESSION | NON-EXISTENCE |
| 1 0 0 0 * * * * | RIGHT-AND-LEFT COMPRESSION | EXISTENCE |
| 1 0 0 1 * * * * | INTER RIGHT-AND-LEFT COMPRESSION | EXISTENCE |
| 1 0 1 0 * * * * | INTER RIGHT-AND-LEFT COMPRESSION MIRROR | EXISTENCE |
| 1 1 0 0 * * * * | RIGHT-AND-LEFT LINKAGE COMPRESSION | EXISTENCE |
| 1 1 0 1 * * * * | INTER RIGHT-AND-LEFT LINKAGE COMPRESSION REPETITION | EXISTENCE |
| 1 1 1 0 * * * * | INTER RIGHT-AND-LEFT LINKAGE COMPRESSION MIRROR | EXISTENCE |
| 1 1 1 1 * * * * | NO DATA | NON-EXISTENCE |

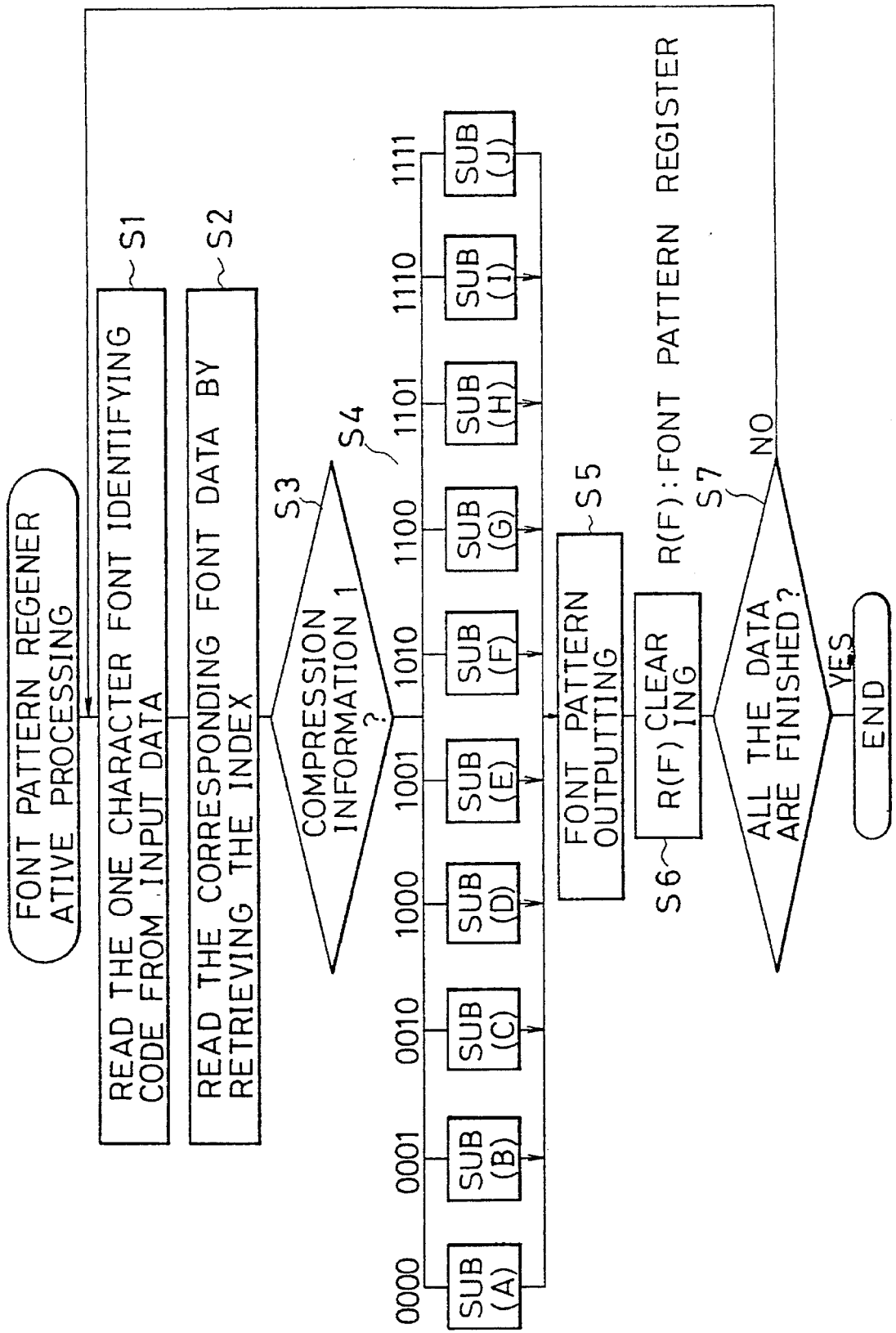

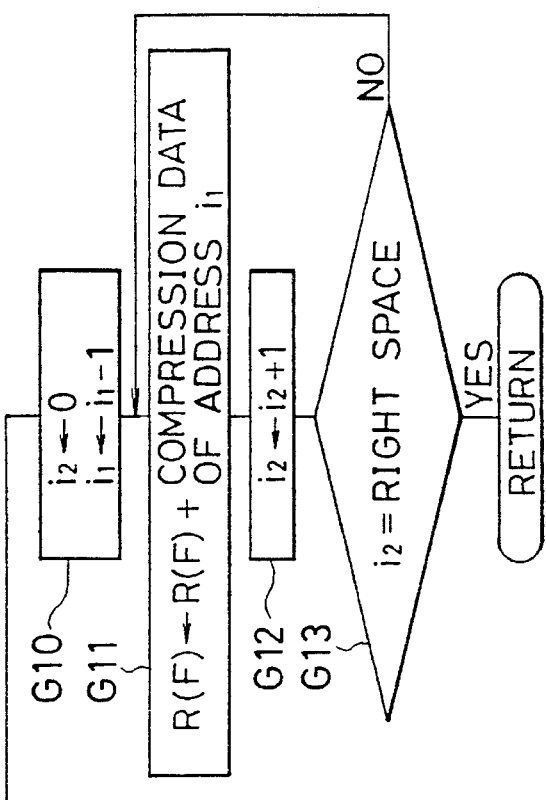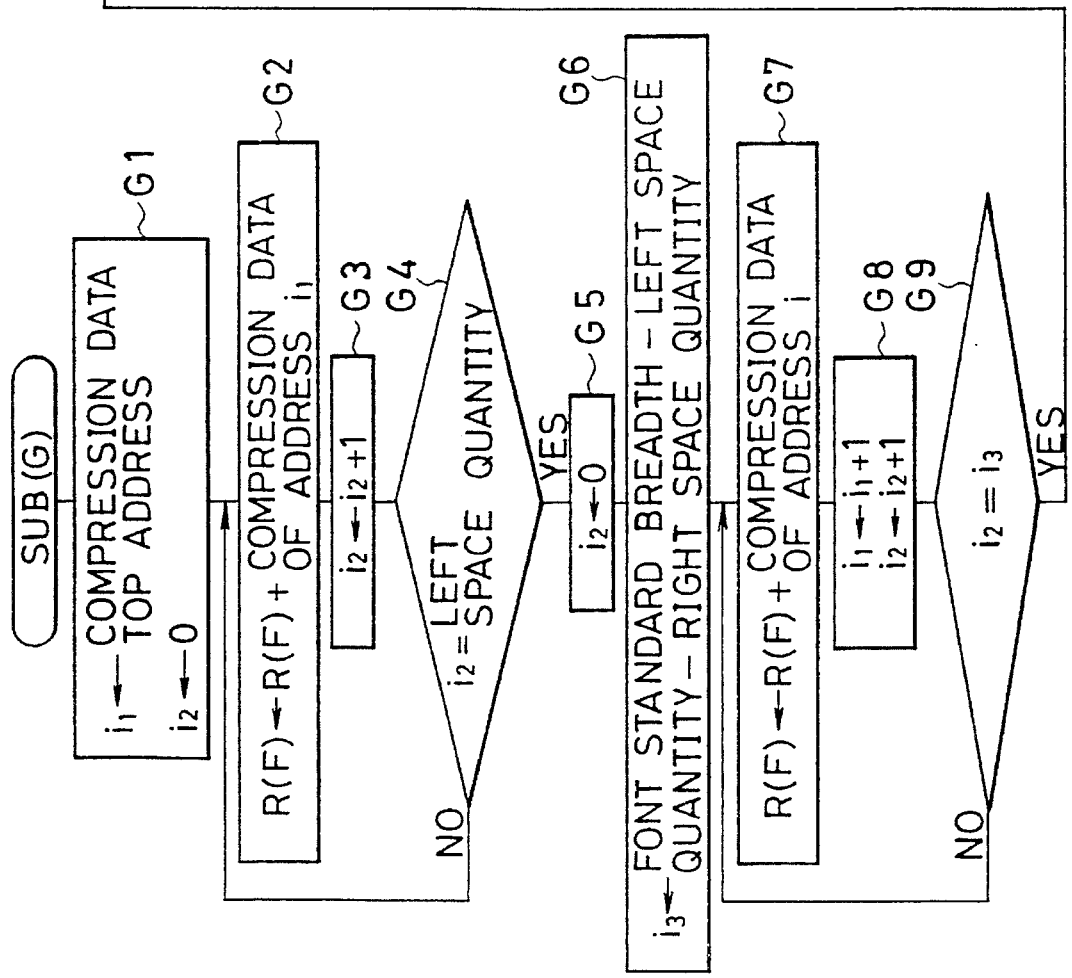
FIG.13

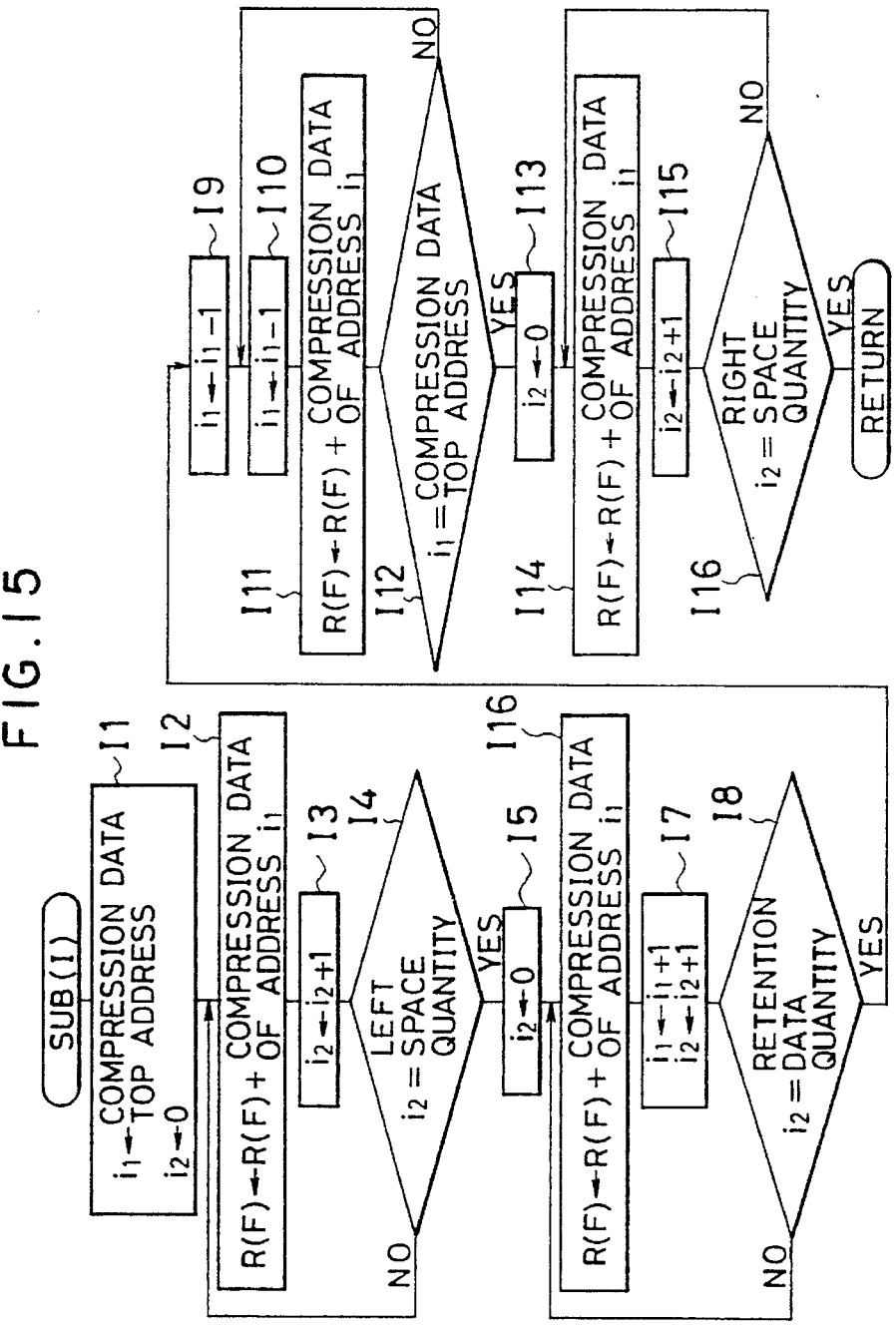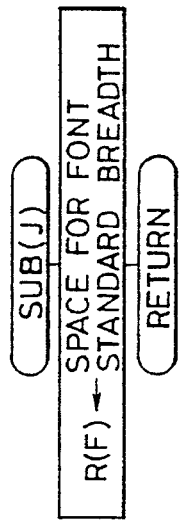

FONT DATA COMPRESSION METHOD IN A CHARACTER GENERATOR

This application is a continuation of application Ser. No. 07/699,615 filed May 15, 1991 now abandoned.

BACKGROUND OF THE INVENTION

1. Field of the Invention

The present invention relates to a font data compression method in a character generator.

2. Description of the Prior Art

In a conventional character generator such as an electronic computer, a Japanese word processor and the like, a ROM stores a whole configuration of font patterns for forming a variety of letters and graphic characters as dot matrix data. On the occasion of printing and graphic display, the graphic characters and letters corresponding to input codes are regenerated from the data of the ROM. With an increase in the number of built-in fonts, however, a storage capacity of the ROM for storing the dot matrix data is increasingly large. Prices of those equipments are forced to increase.

A character pattern compression method disclosed in Japanese Patent Laid-Open No. 66290/1985 was proposed as a method of storing a multiplicity of letters and graphic characters without changing the storage capacity of the ROM. Based on this method, the dot matrix data representing the whole configuration of the font patterns are divided into a multiplicity of windows to detect an inversion or non-inversion of the dot data. More detailed data are prepared for the windows in which the dot data is inverted, thereby obtaining data per hierarchy. Those data are finally totaled, and the font pattern are thereby regenerated. For this reason, the configuration becomes complicated. When applying such a font pattern that the dot data is frequently inverted, this causes a defect of requiring a greater number of data than in the case of effecting no data compression on the whole.

The font data themselves for forming the font patterns can be thinned out by applying a character font degree transform method disclosed in Japanese Patent Laid-Open No. 116890/1984. If such a method is employed, there arises a problem of deteriorating a resolution of the regenerated font patterns. This method is also unsuitable for regenerating the font patterns assuming an intricate configuration.

SUMMARY OF THE INVENTION

It is a primary object of the present invention to provide a font data compression method in a character generator, which is capable of reducing a storage capacity of a ROM by shrinking font data of a variety of letters and graphic characters down to a necessary limit irreducible in accordance with configurational characteristics of font patterns and further regenerating a configuration of the font patterns with a fidelity.

To accomplish the foregoing object, according to one aspect of the invention, there is provided a font data compression method in a character generator, comprising the steps of: causing the character generator to store bit patterns for forming a part of dot matrix data based on a specific rule applied to a plurality of font patterns; and automatically regenerating a whole configuration of the font patterns in accordance with the bit patterns for forming a part of the dot matrix data based on the specific rule which have been stored in the character generator during regeneration of the font patterns.

This method further comprises the steps of causing the character generator to store beforehand the specific bit patterns with respect to the font patterns formed by repeating the specific bit patterns adjacent to each other in the dot matrix and regenerating the whole configuration of the font patterns by repeatedly outputting all of the specific bit patterns during the regeneration of the font patterns.

This method further comprises the steps of causing the character generator to store beforehand the specific bit patterns with respect to the font patterns formed of the specific bit patterns adjacent to each other in the dot matrix in combination with a mirror image obtained with the last bit pattern serving as an axis of symmetry and regenerating the hole configuration of the font patterns by outputting each of the specific bit patterns by one circulation in forward and reverse directions during the regeneration of the font patterns.

This method further comprises the steps of causing the character generator to store beforehand the specific bit patterns and right and left space quantities with respect to the font patterns formed of the specific bit patterns adjacent to each other in the dot matrix in combination with right and left spaces thereof and regenerating the whole configuration of the font patterns by outputting all of the specific bit patterns and spaces corresponding to the right and left space quantities during the regeneration of the font patterns.

This method further comprises the steps of causing the character generator to store beforehand the specific bit patterns and the right and left space quantities with respect to the font patterns formed by repeating the specific bit patterns adjacent to each other in the dot matrix in combination with the right and left spaces and regenerating the whole configuration of the font patterns by repeatedly outputting all of the specific bit patterns and also spaces corresponding to the right and left space quantities during the regeneration of the font patterns.

This method further comprises the steps of causing the character generator to store beforehand the specific bit patterns and the right and left space quantities with respect to the font patterns formed of the specific bit patterns adjacent to each other in the dot matrix in combination with a mirror image obtained with the last bit pattern serving as an axis of symmetry and right and left spaces and regenerating the whole configuration of the font patterns by outputting each of the specific bit patterns by one circulation in forward and reverse directions and also spaces corresponding to the right and left space quantities during the regeneration of the font patterns.

This method further comprises the steps of causing the character generator to store beforehand the specific bit patterns and repetitive quantities of the first column bit pattern and the last bit pattern with respect to the font patterns formed of the specific bit patterns adjacent to each other in the dot matrix in combination of repetitions of the first column bit pattern and the last bit pattern and regenerating the whole configuration of the font patterns by outputting all of the specific bit patterns and repeatedly outputting the first column bit pattern and the last bit pattern of the specific bit patterns, corresponding to the repetitive quantities, during the regeneration of the font patterns.

This method further comprises the steps of causing the character generator to store beforehand the specific bit patterns and repetitive quantities of the first column bit pattern and the last bit pattern with respect to the font patterns formed by repeating the specific bit patterns adjacent to each other in the dot matrix and also repeating the first column bit pattern and the last bit pattern and regenerating the whole configuration of the font patterns by repeatedly outputting all of the specific bit patterns and also repeatedly outputting the first column bit pattern and the last bit pattern of the specific bit patterns, corresponding to the repetitive quantities, during the regeneration of the font patterns.

This method further comprises the steps of causing the character generator to store beforehand the specific bit patterns and repetitive quantities of the first column bit pattern and the last bit pattern of a mirror image with respect to the font patterns formed of the specific bit patterns adjacent to each other in the dot matrix in combination with the mirror image obtained with the last bit pattern serving as an axis of symmetry and repetitions of the last bit pattern of the mirror image and of the first column bit pattern of the specific bit patterns and regenerating the whole configuration of the font patterns by outputting each of the specific bit patterns by one circulation in forward and reverse directions and also repeatedly outputting the last bit pattern of the mirror image and the first column bit pattern of the specific bit patterns, corresponding to the repetitive quantities, during the regeneration of the font patterns.

According to the font data compression method of this invention, the dot matrix data representing the whole configuration of the font patterns are composed only of bit patterns for forming a part of the dot matrix data and numerical value data for determining the bit pattern output number and method which serve as regenerative rules of the font patterns and further right and left space quantities. With this arrangement, the amount of data to be stored in the character generator is reduced. Besides, the initial dot matrix data is exactly reproduced based on these data. A configuration of the font patterns is accurately maintained.

Hence, where the ROM equivalent to the conventional one is employed, the variations can be increased by storing more multiple font patterns than in the prior art. When storing the font patterns equivalent to the conventional ones, a small amount of data to be stored may suffice. A ROM degraded by one class is therefore usable, which in turn reduces the costs of a variety of appliances.

BRIEF DESCRIPTION OF THE DRAWINGS

Other objects and advantages of the invention will become apparent during the following discussion taken in conjunction with the accompanying drawings, in which:

FIG. 2 is a memory map showing an outline of a ROM for a character generator in the same embodiment;

FIGS. 3 and 4 are diagrams each illustrating a bit structure of compression information used in the same embodiment;

FIG. 5 is a diagram showing a relation between compression processing and the compression information used in the same embodiment;

FIG. 6 is a flowchart showing an outline of font pattern regenerative processing in the same embodiment;

FIGS. 7 to 16 are flowcharts each showing an outline of processes associated with regeneration of the compression data.

DETAILED DESCRIPTION OF THE PREFERRED EMBODIMENTS

Figure 1:
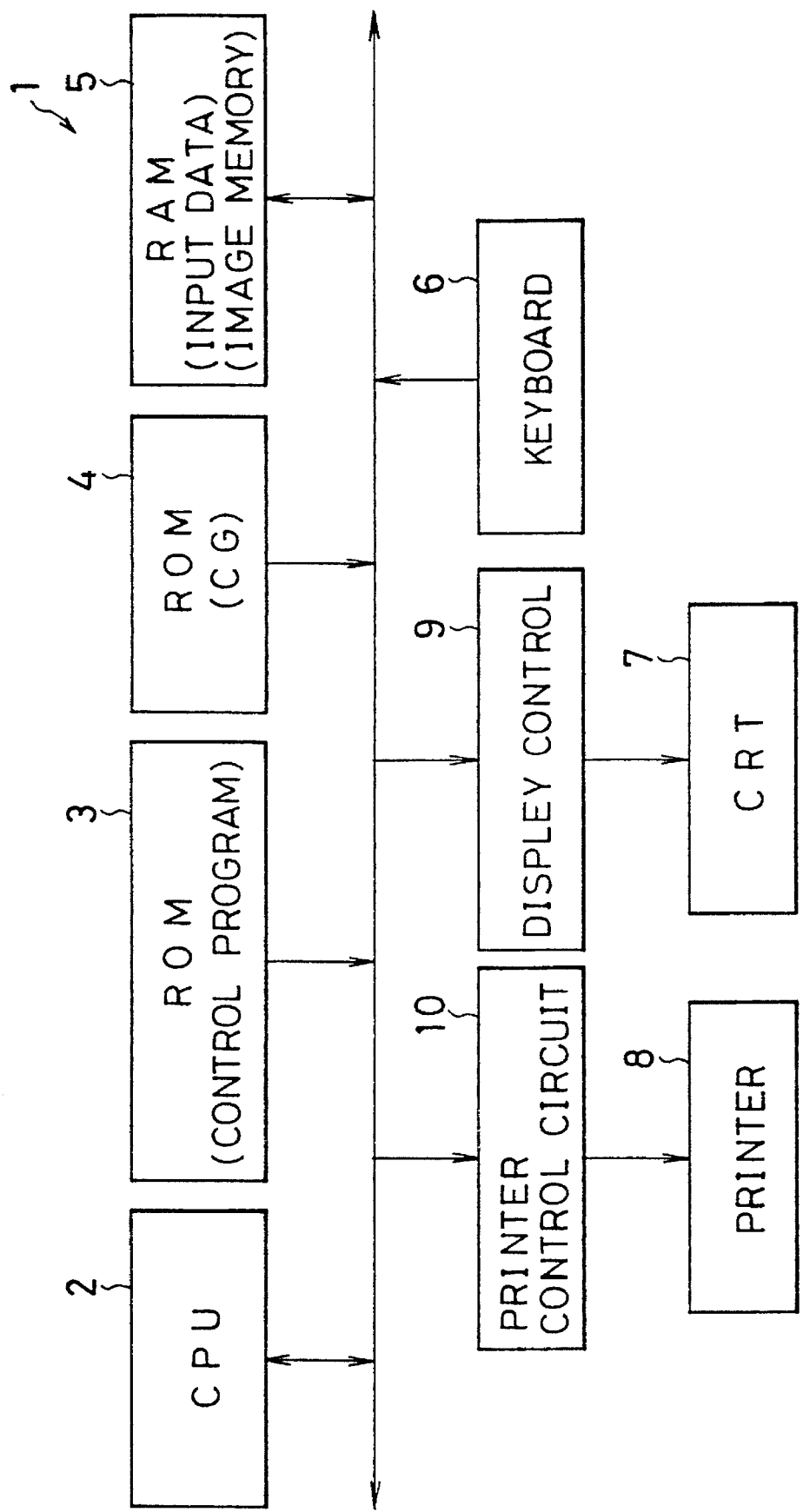
FIG. 1 is a block diagram depicting the principal portions of a Japanese word processor in one embodiment for carrying out a method of this invention.

FIG. 1 is a functional block diagram illustrating principal components of a Japanese word process in one embodiment in which a method according to the present invention is carried out. A word processor 1 essentially consists of a microprocessor 2, a control program ROM 8, a character generator ROM 4, a data storage RAM 5, a keyboard 6, a CRT display unit 7, a printer 8, a display control circuit 9 serving as a driver circuit for respective components, and a printer control circuit 10. Among these components, the microprocessor 2, the control program ROM 3, the character generator ROM 4 and the data storage RAM 5 are combined to virtually constitute a character generator function of this system.

The control program ROM 3 stores a control program of the microprocessor 2. A variety of data (mentioned latter) on the method of the present invention are stored beforehand in the character generator ROM 4. The data storage RAM 5 incorporates a memory unit for temporarily storing arithmetic results of the microprocessor 2 and input data from the keyboard 6. The RAM 5 also incorporates another memory unit for temporarily storing an entire configuration of font patterns regenerated in font pattern regenerative processing by the microprocessor 2.

FIG. 2 is a memory map depicting an outline of the character generator ROM 4 (32K). Stored in high-order addresses 0 (16)-7FFF (16) are identifying codes indicating attributes of the character generator ROM 4. Stored with one-to-one correspondence in an index part employed for retrieving the font data are font identifying codes for identifying the input characters corresponding to the input data from the keyboard 6, a font standard breadth defined as a standard bit pattern width of the character indicated by the font identifying code and a top address showing the first column of compression data of the characters stored in a font data part, corresponding to the font identifying codes. The respective columns of bit patterns of the compression data of the individual characters are sequentially stored in the font data part, corresponding to the top address. Stored also in the font data part is compression information 1 and 2 in the form of numerical value data such as a bit pattern output number and a bit pattern output method conceived as regenerative rules of the font patterns and right and left space quantities. The compression information 1 is 8-bit information for judging which regenerative rule to apply in accordance with configurational characteristics of the letter/graphic character font patterns corresponding to the input data from the keyboard 6. Flags from the seventh bit to the fourth bit indicate, as illustrated in FIGS. 3 and 5, whether or not total width data with no compression are used, whether or not the regenerative rule of repetitive compression is applied, whether or not the regenerative rule of mirror compression is applied, whether or not the regenerative rule of right-and-left compression is applied, whether or not the regenerative rule of inter right-and-left compression repetition is applied, whether or not the regenerative rule of inter right-and-left compression mirror is applied, whether or not the regenerative rule of right-and-left linkage compression is applied, whether or not the regenerative rule of inter right-and-left compression repetition is applied, and whether or not the regenerative rule of inter right-and-left compression is applied. Flags from the third bit to the 0th bit indicate retention data quantities each showing what bit width of the bit pattern to form the compression data of this character.

The compression information 2 indicates what number of columns of each of the right and left space widths to exist in the font patterns of graphic characters and letters to be regenerated in accordance with the configurational characteristics of the font patterns of graphic characters and letters corresponding to the input data from the keyboard 6. As illustrated in FIG. 4, the flags from the seventh bit to the fourth bit indicate left space quantities, while the flags from the third bit to the 0th bit represent right space quantities. Hence, if the right and left space widths do not exist in the font patterns of graphic characters and letters to be regenerated, the compression information 2 is not, as illustrated in FIG. 5, set in the font pattern for effecting the regeneration by use of the total width data with no compression, the font pattern to which the regenerative rule of repetitive compression is applied, the font pattern to which the regenerative rule of mirror compression is applied and the font pattern to which the regenerative rule with no data is applied. The right and left space widths are simply indicated to the font pattern to which the regenerative rule of right-and-left compression is applied, the font pattern to which the regenerative rule of inter right-and-left compression repetition is applied and the font pattern to which the regenerative rule of inter right-and-left compression mirror is applied. On the other hand, the repetitive number of the right and left linkage parts is indicated to the font pattern to which the regenerative rule of right-and-left linkage compression is applied, the font pattern to which the regenerative rule of inter right-and-left linkage compression repetition is applied and the font pattern to which the regenerative rule of inter right-and-left linkage compression mirror is applied.

The following is an exemplification of the 12-row/12-column dot matrix based font patterns of graphic characters and letters. Application examples of the regenerative rules thereof will be also given.

Figure 18:
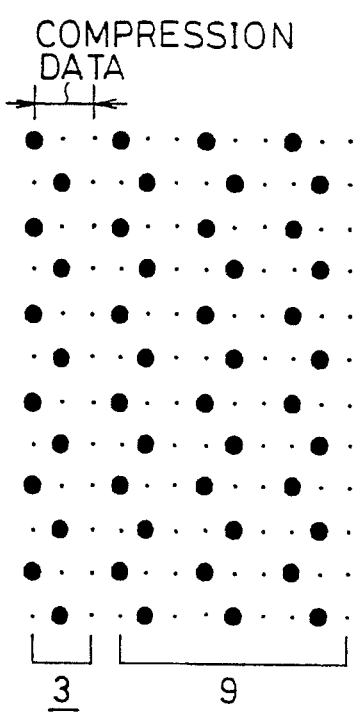

FIG. 18 is a representation of a graphic character, showing an example of the font pattern to which the regenerative rule of repetitive compression is applied. This graphic character is formed of specific bit patterns in the 12-row/12-column dot matrix, i.e., by repeating the bit pattern extending from the first column to the third column. Therefore, 0001 indicating the repetitive compression is set in the 7th bit through 4th bit of the compression information 1 associated with this graphic character. A retention data quantity defined as a bit width of the compression data is set in the 3rd bit through the 0th bit. The respective bit patterns from the first column to the third column of the original font pattern configuration are sequentially stored as compression data in the font data part of the character generator ROM 4. The font standard breadth and the top address of the font data indicating the first column of the compression data are stored in the index part of the character generator ROM 4 by making one-to-one correspondence to the font identifying code of this graphic character. In the case of this graphic character, the conventional method of storing the configuration of the entire font pattern in the ROM as dot matrix data requires a storage capacity of 144 bits. Based on the font data compression method in the embodiment, it is possible to save the storage capacity down to 44 bits, a total sum of the compression data of 12 bits×3 columns and the 8-bit compression information 1. The compression information 1 and the compression data per column are prepared as in the same way as above with respect to the graphic characters and letters which are formed by repeating specific bit patterns adjacent to each other in the dot matrix—all the graphic characters and letters such as, e.g., [–] and [=] or the like to which the regenerative rule of repetitive compression is applicable. Stored in the character generator ROM 4 are the compression information 1 and the compression data together with the font identifying code, the font standard breadth and the top address. Note that the embodiment deals with the 12-row/12-column dot matrix based font patterns of the graphic characters and letters, and hence a value of the font standard breadth defined as a standard bit pattern width is invariably 12.

Figure 19:
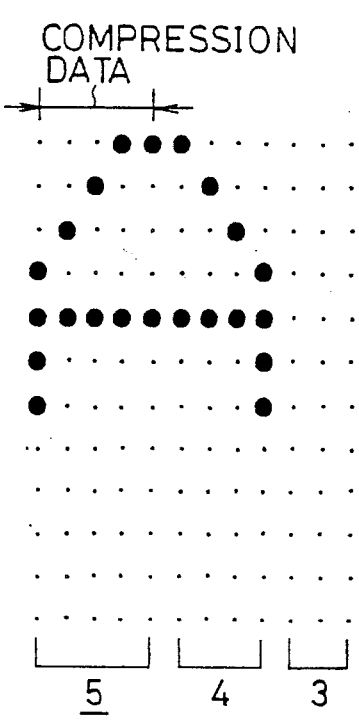

FIG. 19 is a representation of a letter showing an example of the font pattern to which the regenerative rule of mirror compression is applied. This letter is formed of specific bit patterns adjacent to each other in the dot matrix in combination with a mirror image obtained with the last bit pattern serving as an axis of symmetry, more specifically, the bit patterns from the first column to the fifth columns in combination with the mirror image obtained with the last bit pattern of the fifth column. Therefore, 0010 representing the mirror compression is set in the seventh bit through the fourth bit of the compression information on this letter. A retention data quantity 0101 conceived as a bit width of the compression data is set in the third bit through the 0th bit. At the same moment, the respective bit patterns from the first column to the fifth column of the original font pattern configuration are sequentially stored as compression data in the font data part of the character generator ROM 4. The font standard breadth and the top address of the font data which indicates the first column of the compression data are stored in the index part of the character generator ROM 4 by making one-to-one correspondence to the font identifying code of this letter. In the case of this letter, the storage capacity can be saved down to 68 bits, a total sum of the compression data of 12 bits×5 columns and the 8-bit compression information 1. Hereinafter, the compression information 1 and the compression data per column are similarly prepared with respect to all the letters and graphic characters to which the regenerative rule of mirror compression is applicable—i.e., all the letters and graphic characters such as [M], [X] and the like formed of the specific bit patterns adjacent to each other in the dot matrix in combination with the mirror image obtained with the last bit pattern serving as an axis of symmetry. The compression information 1 and the compression data are stored together with the font identifying code, the font standard breadth and the top address in the character generator ROM 4.

Figure 20:
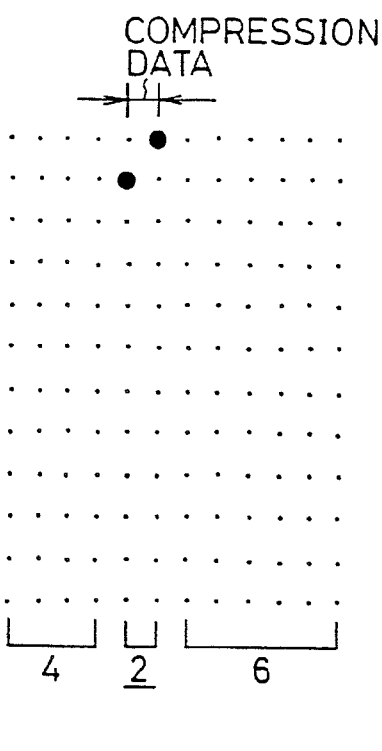

FIG. 20 is a representation of a graphic character showing an example of the font pattern to which the regenerative rule of right-and-left compression is applied. This graphic character is formed of the specific bit patterns adjacent to each other in the dot matrix in combination with right and left spaces thereof, more specifically, the adjacent bit patterns from the fifth column to the sixth column in combination with the right and left spaces thereof. Therefore, 1000 indicating the right-and-left compression is set in the seventh bit through the fourth bit of the compression information 1 on this letter. In this case, a value of the retention data quantity defined as a bit width of the compression data is not given. 0000 is set in the third bit to the 0th bit of the compression information 1 (unused). 0100 of the left space quantity is set in the seventh bit through the fourth bit of the compression information 2. 0110 of the right space quantity is set in the third bit through the 0th bit. At the same time, the respective bit patterns from the fifth column to the sixth column of the original font pattern configuration are sequentially stored as compression data in the font data part of the character generator ROM 4. The font standard breadth and the top address of the font data which indicates the fist column of the compression data are stored in the index part of the character generator ROM 4 by making one-to-one correspondence to the font identifying code of this graphic character. In the case of this graphic character, it is feasible to save the storage capacity down to 40 bits, a total sum of the compression data of 12 bits×2 columns and the compression information 2 of 8 bits×2. Hereinafter, the compression information 1, the compression information 2 and the compression data per column are likewise prepared with respect to the graphic characters and letters formed of the specific bit patterns adjacent to each other in the dot matrix in combination with the right and left spaces thereof—i.e., all the graphic characters and letters such as [1], [I] and the like to which the regenerative rule of right-and-left compression is applicable. The compression information 1, the compression information 2 and the compression data are stored together with the font identifying code, the font standard breadth and the top address in the character generator ROM 4.

Figure 21:
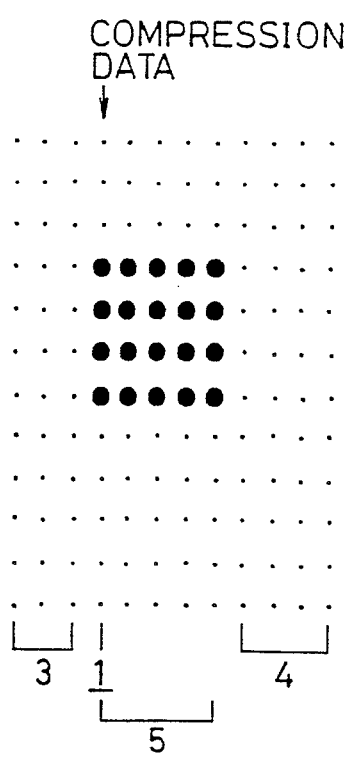

FIG. 21 is a representation of a graphic character showing an example of the font pattern to which the regenerative rule of inter right-and-left compression repetition corresponding to claim 5. This graphic character is formed of the repetitive specific bit patterns adjacent to each other in the dot matrix in combination with the right and left spaces thereof, i.e., the repetitive bit patterns of the fourth column in combination with the right and left spaces thereof. Hence, 1001 indicating the inter right-and-left compression repetition is set in the seventh bit through the fourth bits of the compression information 1 associated with this letter. A retention data quantity 0001 defined as a bit width of the compression data is set in the third bit through the 0th bit. A left space quantity 0011 is set in the seventh bit through the fourth bit of the compression information 2. A right space quantity 00100 is set in the third bit through the 0th bit. Simultaneously, the four column bit pattern of the original font pattern configuration is stored as compression data in the font data part of the character generator ROM 4. Stored in the index part of the character generator ROM 4 are the font standard breadth and the top address of the font data which indicates the first column of the compression data by making one-to-and correspondence to the font identifying code of this graphic character. In the case of this graphic character, the storage capacity can be saved down to 28 bits, a total sum of the 12-bit/1-column compression data and the (8 bits×2) compression information 1, 2. Hereinafter, the compression information 1, 2 and the compression data per column are similarly prepared with respect to the graphic characters and letters formed of the repetitive specific dot patterns adjacent to each other in the dot matrix in combination with the right and left spaces thereof, viz., all the letters and graphic characters to which the regenerative rule of inter right-and-left compression repetition is applicable. The compression information 1, 2 and the compression data are stored together with the font identifying code, the font standard breadth and the top address in the character generator ROM 4.

Figure 22:
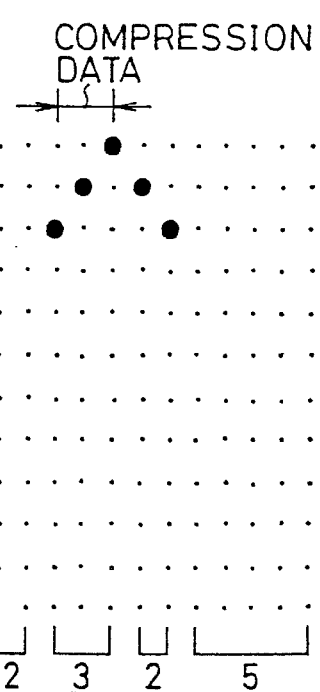

FIG. 22 is a representation of a graphic character showing an example of the font pattern to which the regenerative rule of inter right-and-left compression mirror is applied. This graphic character is formed of the specific bit patterns adjacent to each other in the dot matrix in combination with a mirror image obtained with the last bit pattern serving as an axis of symmetry and the right and left spaces—i.e., the bit patterns from the third column to the fifth column, the mirror image obtained with the last bit pattern of the fifth column serving as the axis of symmetry and the right and left spaces. Hence, 1010 indicating the inter right-and-left compression mirror is set in the seventh bit through the fourth bit of the compression information on this graphic character. A retention data quantity 0011 defined as a bit width of the compression data is set on the third bit through the 0th bit. A left space quantity 0010 is set in the seventh bit through the fourth bit of the compression information 2. A right space quantity 0101 is set in the third bit through the 0th bit. At the same moment, the respective bit patterns from the third column to the fifth column of the original font pattern configuration are sequentially stored as compression data in the font data part of the character generator ROM 4. Stored in the index part of the character generator ROM 4 are the font standard breadth and the top address of the font data which indicates the first column of the compression data by making one-to-one correspondence to the font identifying code of this letter. In the case of this graphic character, the storage capacity can be saved down to 52 bits, a total sum of the 12-bit/3-column compression data and the (8 bits×2) compression information 1, 2. Hereinafter, the compression information 1, 2 and the compression data per column are similarly prepared with respect to the graphic characters and letters formed of the specific dot patterns adjacent to each other in the dot matrix in combination with a mirror image obtained with the last bit pattern serving as an axis of symmetry and the right and left spaces, i.e., all the letters and graphic characters such as [↑], [↓] and the like to which the regenerative rule of inter right-and-left compression mirror is applicable. The compression information 1, 2 and the compression data are stored together with the font identifying code, the font standard breadth and the top address in the character generator ROM 4.

Figure 23:
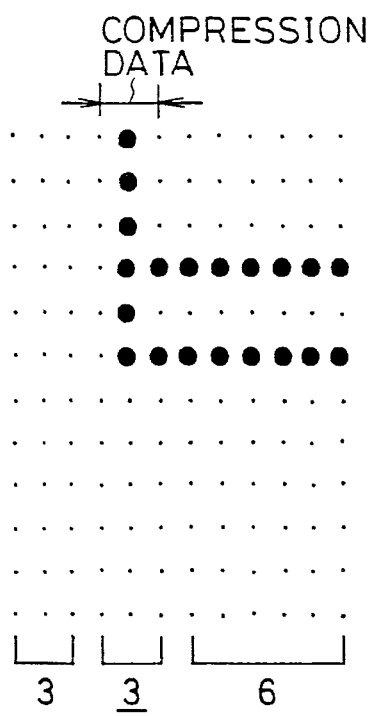

FIG. 23 is a representation of a graphic character showing an example of the font pattern to which the regenerative rule of right-and-left linkage compression is applied. This graphic character is formed of the specific bit patterns contiguous to each other in the dot matrix in combination with repetitions of the bit pattern of the first column and the last bit pattern—i.e., the adjacent bit patterns from the fourth column to the sixth column in combination with repetitions of the top, viz., the fourth column bit pattern and the last, viz., the sixth column bit pattern. Hence, 1100 indicating the right-and-left linkage compression is set in the seventh bit through the fourth bit of the compression information 1 relative to this graphic character. In this case, a value of the retention data quantity defined as a bit width of the compression data is not given, instead 0000 is set in the third bit through the 0th bit of the compression 1 (unused). A left space quantity 0011 conceived as a repetitive quantity of the first column bit pattern in the compression data is set in the seventh bit through the fourth bit of the compression information 2. Set in the third bit through the 0th bit is a right space quantity 0110 conceived as a repetitive quantity of the last bit pattern in the compression data. The bit patterns from the fourth column to the sixth column of the original font pattern configuration are stored as compression data in the font data part of the character generator ROM 4. Stored in the index part of the character generator ROM 4 are the font standard breadth and the top address of the font data which indicates the first column of the compression data by making one-to-one correspondence to the font identifying code of this graphic character. In the case of this graphic character, the storage capacity can be saved down to 52 bits, a total sum of the 12-bit/8-column compression data and the (8 bits×2) compression information 1, 2. Hereinafter, the compression information 1, 2 and the compression data per column are similarly prepared with respect to the graphic characters and letters formed of the specific bit patterns contiguous to each other in the dot matrix in combination with repetitions of the first column bit pattern and the last bit pattern, i.e., all the letters and graphic characters such as [÷]

and the like to which the regenerative rule of right-and-left linkage compression is applied. The compression information 1, 2 and the compression data are stored together with the font identifying code, the font standard breadth and the top address in the character generator ROM 4.

Figure 24:
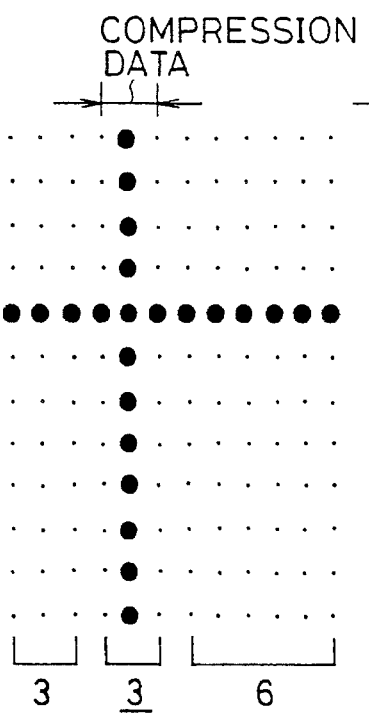

FIG. 24 is a representation of a graphic character showing an example of the font pattern to which the regenerative rule of inter right-and-left linkage compression repetition is applied. This graphic character is formed by a repetition of the specific bit patterns contiguous to each other in the dot matrix in combination with repetitions of the first column bit pattern and the last bit pattern, i.e., by a repetition (once in this case) of the adjacent bit patterns from the fourth column to the sixth column in combination with repetitions of the top, viz., the fourth column bit pattern and the last, viz., the sixth column bit pattern. Hence, 1101 indicating the inter right-and-left linkage compression repetition is set in the seventh bit through the fourth bit of the compression information 1 relative to this graphic character. A retention data quantity 0011 defined as a bit width of the compression data is set in the third bit through the 0th bit. A left space quantity 0011 conceived as a repetitive quantity of the first column bit pattern in the compression data is set in the seventh bit through the fourth bit of the compression information 2. Set in the third bit through the 0th bit is a right space quantity 0110 conceived as a repetitive quantity of the last bit pattern in the compression data. Simultaneously, the bit patterns from the fourth column to the sixth column of the original font pattern configuration are sequentially stored as compression data in the font data part of the character generator ROM 4. Stored in the index part of the character generator ROM 4 are the font standard breadth and the top address of the font data which indicates the first column of the compression data by making one-to-one correspondence to the font identifying code of this graphic character. In the case of this graphic character, the storage capacity can be saved down to 52 bits, a total sum of the 12-bit/3-column compression data and the (8 bits×2) compression information 1, 2. Hereinafter, the compression information 1, 2 and the compression data per column are similarly prepared with respect to the graphic characters and letters formed by the repetition of the specific bit patterns contiguous to each other in the dot matrix in combination with repetitions of the first column bit pattern and the last bit pattern, i.e., all the letters and graphic characters to which the regenerative rule of inter right-and-left linkage compression repetition is applicable. The compression information 1, 2 and the compression data are stored together with the font identifying code, the font standard breadth and the top address in the character generator ROM 4.

Figure 25:
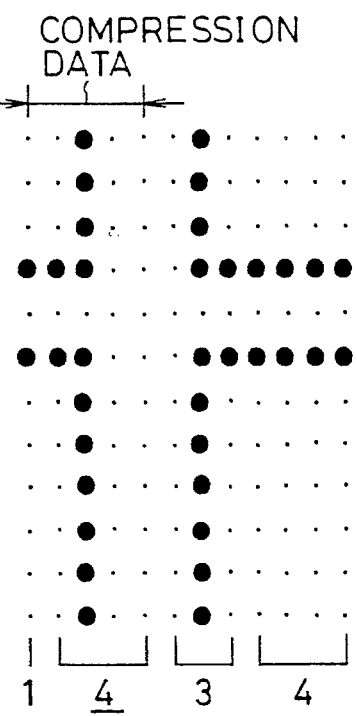

FIG. 25 is a representation of a graphic character showing an example of the font pattern to which the regenerative rule of inter right-and-left linkage compression mirror is applied. This graphic character is formed of the specific bit patterns contiguous to each other in the dot matrix in combination with a mirror image obtained with the last bit pattern serving as an axis of symmetry and repetitions of the first column bit pattern of the specific bit patterns and the last bit pattern thereof, i.e., formed of the adjacent bit patterns from the second column to the fifth column in combination with the mirror image obtained with the last, viz., the fifth column bit pattern and repetitions of the first column bit pattern of the specific bit patterns and the last bit pattern of the mirror image, viz., the first column bit pattern of the specific bit patterns. Therefore, 1110 indicating the inter right-and-left linkage compression mirror is set in the seventh bit through the fourth bit of the compression information 1 relative to this graphic character. A retention data quantity 0100 defined as a bit width of the compression data is set in the third bit through the 0th bit. A left space quantity 0001 conceived as a repetitive quantity of the first column bit pattern in the compression data is set in the seventh bit through the fourth bit of the compression information 2. Set in the third bit through the 0th bit is a right space quantity 0100 conceived as a repetitive quantity of the last bit pattern of the mirror image in the compression data. Simultaneously, the bit patterns from the second column to the fifth column of the original font pattern configuration are sequentially stored as compression data in the font data part of the character generator ROM 4. Stored in the index part of the character generator ROM 4 are the font standard breadth and the top address of the font data which indicates the first column of the compression data by making one-to-one correspondence to the font identifying code of this graphic character. In the case of this graphic character, the storage capacity can be saved down to 64 bits, a total sum of the 12-bit/4-column compression data and the (8 bits×2) compression information 1, 2. Hereinafter, the compression information 1, 2 and the compression data per column are similarly prepared with respect to the graphic characters and letters formed of the specific bit patterns contiguous to each other in the dot matrix in combination with the mirror image obtained with the last bit pattern serving as the axis of symmetry and repetitions of the first column bit pattern of the forgoing specific bit patterns and the last bit pattern of the mirror image, i.e., all the letters and graphic characters to which the regenerative rule of inter right-and-left linkage compression mirror is applicable. The compression information 1, 2 and the compression data are stored together with the font identifying code, the font standard breadth and the top address in the character generator ROM 4.

Figure 17:
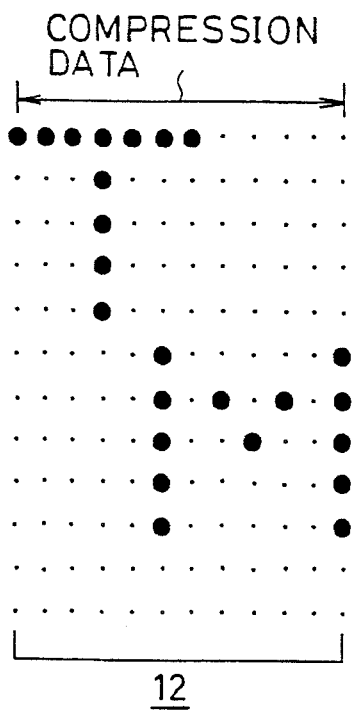
FIGS. 17 to 26 are diagrams each exemplifying a configuration of the font pattern.

FIG. 17 is a representation of a graphic character showing one example of the font pattern to which those regenerative rules are unapplicable. For the font pattern to which the regenerative rules can not be applied, 00000000 is set in the seventh through the 0th bit of the compression information 1. At the same time, all the bit patterns from the first column to the twelfth bit pattern which correspond to the font standard breadth are sequentially stored as compression data in the font data part of the character generator ROM 4. Stored in the index part of the character generator ROM 4 are the font standard breadth and the top address of the font data which indicates the first column of the compression data by making one-to-one correspondence to the font identifying code of this graphic character. Hence, a storage capacity of 144 bits per character is, as is similar to the conventional example, required for the font pattern to which the regenerative rules are unapplicable. Hereinafter, the compression information 1 and the compression data for the font standard breadth are likewise prepared with respect to all the graphic characters and letters configured by the font patterns to which the regenerative rules can not be applied. The compression information and the compression data are stored together with the font identifying code, the font standard breadth and the top address in the character generator ROM 4.

Figure 26:
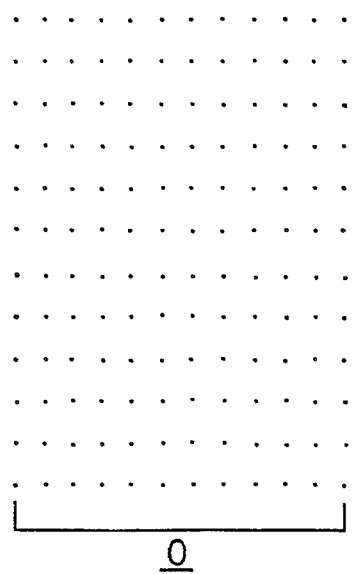

FIG. 26 is a representation of a graphic depicting the font pattern serving as a one-character space. For this graphic, 11110000 is set in the seventh bit through the 0th bit of the compression information 1. Note that this graphic does not include the bit patterns serving as compression data. Only the font identifying code, the font standard breadth and the compression information 1 are stored in the character generator ROM 4. Stored all in the character generator ROM 4 by applying each of the regenerative rules are a font 608 character formed in a (8 rows×12 columns) dot matrix, a font character 608 formed in a (8 rows×10 columns) dot matrix and a font 608 character formed in a (16 rows×24 columns) dot matrix. A storage capacity necessary for this is 32321 bytes. A storage capacity of 17149 bytes is saved as compared with a storage capacity of 49470 bytes needed during non-compression. This implies that a 32K (=32786) ROM can be utilized in place of a conventionally required 64K (=65536) ROM.

Font pattern regenerative processing in this embodiment will be described with reference to a flowchart showing an outline of regenerative processing of the font patterns stored in the control program ROM 3 and a flowchart showing regenerative processing for every regenerative rule.

Note that the letters and graphic characters illustrated in FIGS. 17 to 26 have been already stored in the data storage RAM 5 by inputting of the keyboard. It is assumed that font pattern regenerative processing starts in accordance with manipulation of execution keys disposed on the keyboard 6.

FIG. 6 is a flowchart showing an outline of font pattern regenerative processing. The microprocessor 2, which initiates font pattern regenerative processing, at first reads one-character input data from the input data stored in the data storage RAM 5 (step S1). The microprocessor 2 retrieves the font identifying code corresponding to the input data by effecting an access to the index part of the character generator ROM 4. The microprocessor 2 reads both a value of the font standard breadth corresponding thereto and the top address of the font data. Based on the top address, the microprocessor 2 reads the compression information 1, 2 corresponding to the font identifying code and also the compression data from the font data part of the character generator ROM 4 (step S2). A regenerative rule to be employed for regenerating this compression data is judged based on a value of the compression information 1 (step S3). Any one of subprograms (A)–(J) is executed in conformity with the corresponding regenerative rule. The compression data is regenerated in a font pattern register R(F) (step S4). Storing in an image memory unit of the data storage RAM 5 is performed by outputting the font pattern regenerated in the font pattern register R(F) (step S5). Thereafter, a value of the font pattern register R(F) is initialized (step S6).

Made is a judgment as to whether or not font pattern regenerative processing of steps S1–S6 are executed for all the input data stored in the data storage RAM 5 (step S7). If there exist the input data undergoing no execution of font pattern regenerative processing, the operation returns to step S1. Font pattern regenerative processing of steps S1–S6 are similarly executed for all the unexecuted data.

Next, processing of step S4 associated with regeneration of the compression data will be described in detail.

Figure 7:
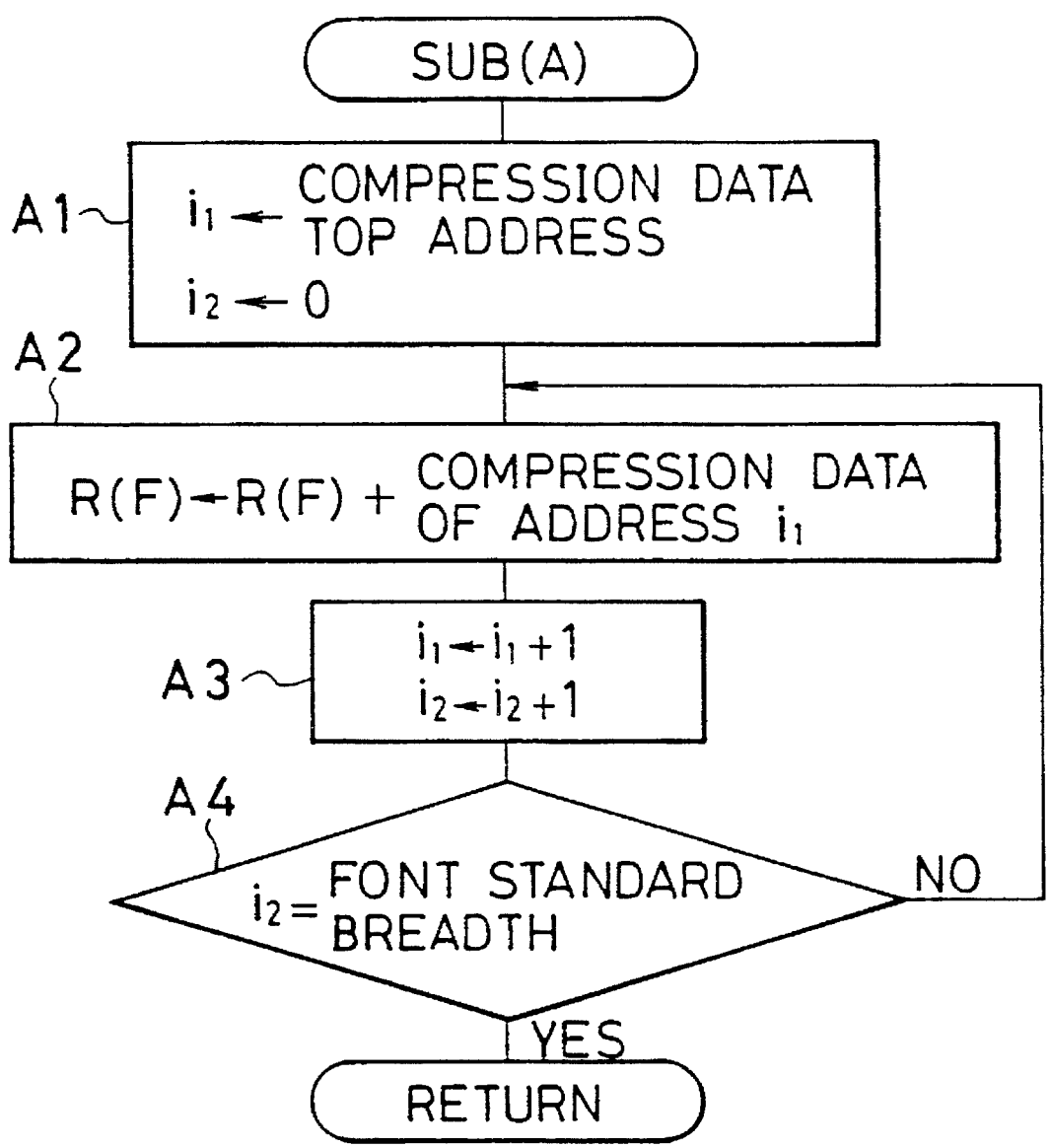

If a value from the seventh bit to the fourth bit of the compression information 1 turns out to be 0000 in step S3 of font pattern regenerative processing, this implies the font pattern to which the ordinary regenerative rules are unapplicable. A subprogram (A) shown in FIG. 7 is executed.

The microprocessor 2 at first sets, in an index $i_1$, the top address of the compression data read in step S2 of font pattern regenerative processing. The microprocessor 2 sets an initial value 0 in a counter $i_2$ (step A1). The bit pattern of the address indicated by the index $i_1$ is set in the font pattern register R(F) (step A2). The index $i_1$ is incremented to update the address of the bit pattern to be set in the font pattern register R(F). At the same moment, a value of the counter $i_2$ is incremented, and the number of the bit patterns set in the font pattern register R(F) is stored (step A3).

Next, whether or not the value of the counter $i_2$ reaches a value of the font standard breadth read in step S2 of font pattern regenerative processing is judged (step A4). If not, the processes of steps A2 through A4 are, as in the same way as above, repeatedly executed. All the examples of the bit patterns stored as compression data are set in the font pattern register R(F).

In the example depicted in FIG. 17, the value of the font standard breadth is 12. Therefore, the first column bit pattern of the compression data is set in the font pattern register R(F) on the basis of the top address of the compression data read in step S2 of font pattern regenerative processing. Thereafter, the bit patterns of 12 columns constituting the respective columns of the compression data are sequentially set in the font pattern register R(F). A value of the counter $i_2$ becomes 12, at which stage the 12-row/12-column font patterns are regenerated.

Figure 8:
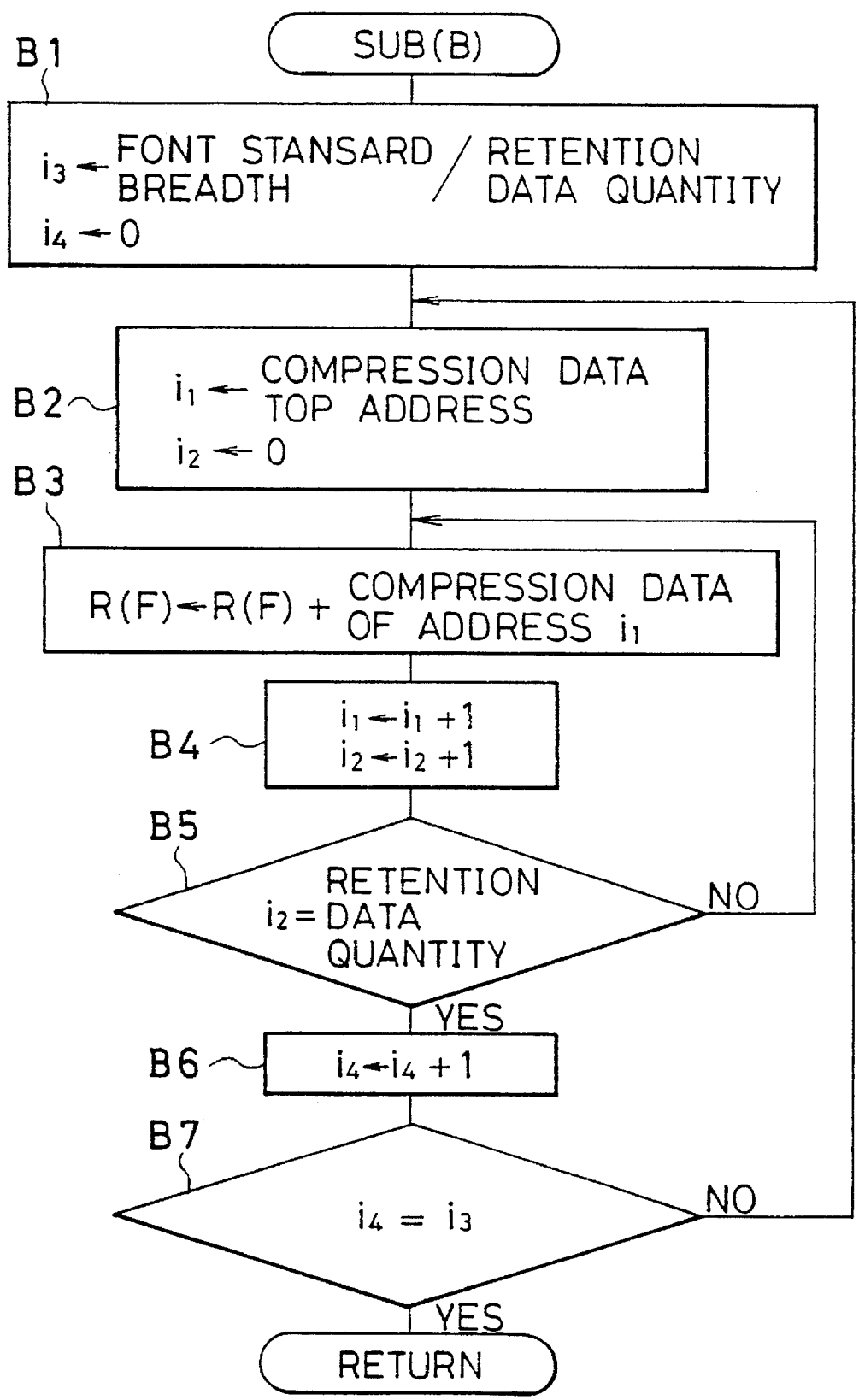

In step S3 of font pattern regenerative processing, if the value from the seventh bit to the fourth bit of the compression information 1 turns out to be 0001, this implies the font pattern to which the regenerative rule of repetitive compression is applicable. A subprogram (B) shown in FIG. 8 is executed.

The microprocessor 2 calculates a repetitive output number $i_3$ of the compression data. This output number is obtained by dividing a value of the font standard breadth read in step S2 of font pattern regenerative processing by a value of the retention data quantity given based on the compression information 1. After setting an initial value 0 in an output number storage counter $i_4$ (step B1), the top address of the compression data read in step S2 of font pattern regenerative processing is set in the index $i_1$. Simultaneously, the initial value 0 is set in the counter $i_2$ (step B2). The bit pattern of the address indicated by the index $i_1$ is set in the font pattern register R(F) (step B3).

Subsequently, the index $i_1$ is incremented to update the address of the bit pattern to be set in the font pattern register R(F). At the same time, a value of the counter $i_2$ is incremented, and the number of the bit patterns set in the font pattern register R(F) is stored (step B4). Made is a judgment as to whether or not the value of the counter $i_2$ reaches the value of the retention data quantity given based on the compression information 1 (step B5). If not, the presses of steps B3–B5 are, as in the same manner as above, repeatedly executed. All the columns of the bit patterns stored as compression data are set in the font pattern register R(F).

In the example illustrated in FIG. 18, a value of the retention data quantity is 3. Hence, the first column bit pattern of the compression data is set in the font pattern register R(F) on the basis of the top address of the compression data. Thereafter, the bit patterns of 3 columns constituting the respective columns of the compression data are sequentially set in the font pattern register R(F). A value of the counter $i_2$ comes to 3, at which stage all the 12-row/3-column bit patterns are regenerated.

The columns of all the bit patterns constituting the compression data are set in this manner. The microprocessor 2 increments a value of the output number storage counter $i_4$ and then stores the output number of the compression data (step B6). Whether the value of the output number storage counter $i_4$ reaches a repetitive output number $i_3$ of the compression data is judged (step B7). If not, the operation returns to step B2, wherein values of the index $i_1$ and of the counter $i_2$ are reset. The processes of steps B3–B5 are, as in the same way as above, repeatedly executed.

In the example illustrated in FIG. 18, a value of the font standard breadth is 12, while a value of the retention data quantity is 3. Hence, a value of the repetitive output number $i_3$ becomes 4. The processes of steps B3–B5 for regenerating the 12-row/3-column bit patterns constituting the compression data are repeatedly executed four times. At this stage, the value of the output number storage counter $i_4$ reaches the value of the repetitive output number $i_3$. Namely, in the example shown in FIG. 18, the 12-row/3-column bit patterns constituting the compression data are repeatedly outputted four times, thereby regenerating the 12-row/12-column font patterns.

Figure 9:
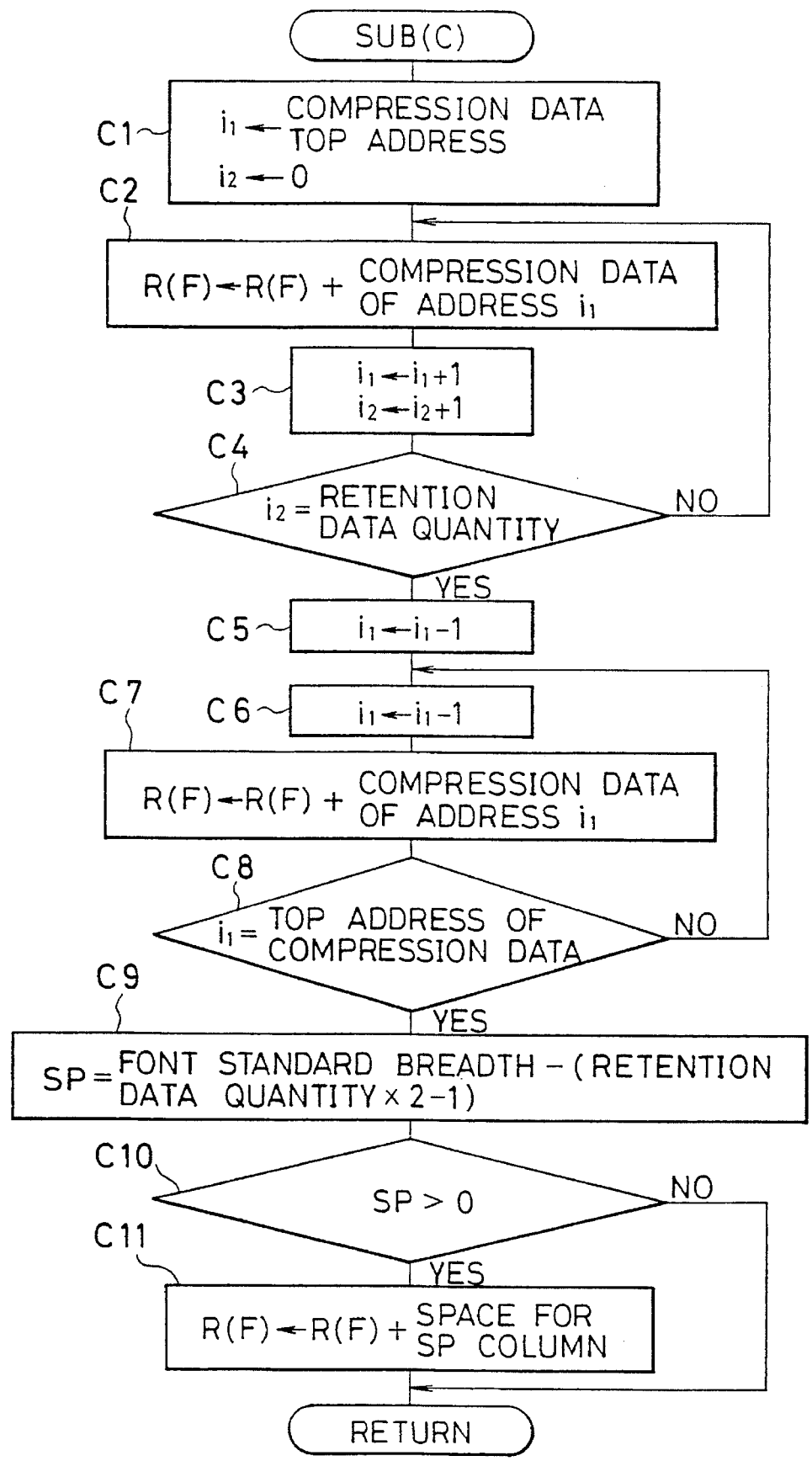

If a value from the seventh bit to the fourth bit of the compression information 1 turns out to be 0010 in step S3 of font pattern regenerative processing. This implies the font pattern to which the regenerative rule of mirror compression corresponding to claim 3 is applicable. A subprogram depicted in FIG. 9 is executed.

The microprocessor 2 at first outputs the columns of the bit patterns stored as compression data by one circulation in a forward direction according to the processes of steps C1–C4 equivalent to steps A1–A4 of FIG. 7. Those bit pattern columns are set in the font pattern register R(F). A different point from FIG. 7 is, however, that the value of the counter $i_2$ is compared with the value of the retention data quantity given based on the compression information 1.

In an example illustrated in FIG. 19, a value of the retention data quantity is 5. Therefore, the first column bit pattern of the compression data is set in the font pattern register R(F) on the basis of the top address of the compression data read in step S2 of font pattern regenerative processing. Thereafter, all the 12-row/5-column compression data are set in the font pattern register R(F). At this stage, a value of the counter $i_2$ comes to 5. The processes assuming a loop configured by steps C2–C4 are completed.

The microprocessor 2, which moves to step C5, decrements a value of index $i_1$ which has been incremented in step C3 just before it. The microprocessor 2 makes the value of the index $i_1$ coincident with an address value indicating the last bit pattern of the compression data. After decrementing the value of the index $i_1$ (step C6), the microprocessor 2 sets the bit pattern of the compression data indicated by the index $i_1$ in the font pattern register R(F) (step C7). Made is a judgment as to whether or not the value of the index $i_1$ returns to a value of the top address of the compression data (step C8). If not, the processes of steps C6–C7 are repeatedly executed. The bit patterns of the compression data indicated by the index $i_1$ are sequentially set in the font pattern register R(F).

In the example shown in FIG. 19, all the 12-row/5-column compression data are set in the font pattern register R(F), at which stage the value of the index $i_1$ is 6. For this reason, the value of the index $i_1$ is set to 5 in step C5. This value is equal to an address value representing the last bit pattern which configures an axis of symmetry. Hereinafter, the processes of steps C6–C8 are repeatedly executed. Outputted by one circulation in the reverse direction are the bit patterns of columns constituting the first 12 rows and 4 columns among the 12-row/5-column compression data. A mirror image obtained with the last bit pattern of the compression data serving as the symmetry axis is thereby set in the font pattern register R(F). At this stage, a letter [A] formed in a 12-row/8-column dot matrix is regenerated in the font pattern register R(F). Note that if the last bit pattern of the compression data is to be contained in a part of the mirror image, processing of step C5 may be set in a non-executable status.

The microprocessor 2, after completing the processes assuming a loop configured by steps C6–C8, moves to step C9. The microprocessor 2 calculates a right space quantity SP for the font standard breadth by subtracting a value given such as the retention data quantity×2–1 from a value of the font standard breadth read in step S2 of font pattern regenerative processing. When SP>0 (step C10), space columns corresponding to the right space quantity SP are set in the font pattern register R(F) (step C11).

In the example depicted in FIG. 19, a value of the right space quantity SP is given by: 12–(5×–1)=3. The right space for 3 columns is set, and it follows that the 12-row/12-column font patterns are regenerated. If the final bit pattern of the compression data is to be contained in a part of the mirror image, the formula of step C9 is expressed such as SP=font standard breadth–(retention data quantity×2).

Figure 10:
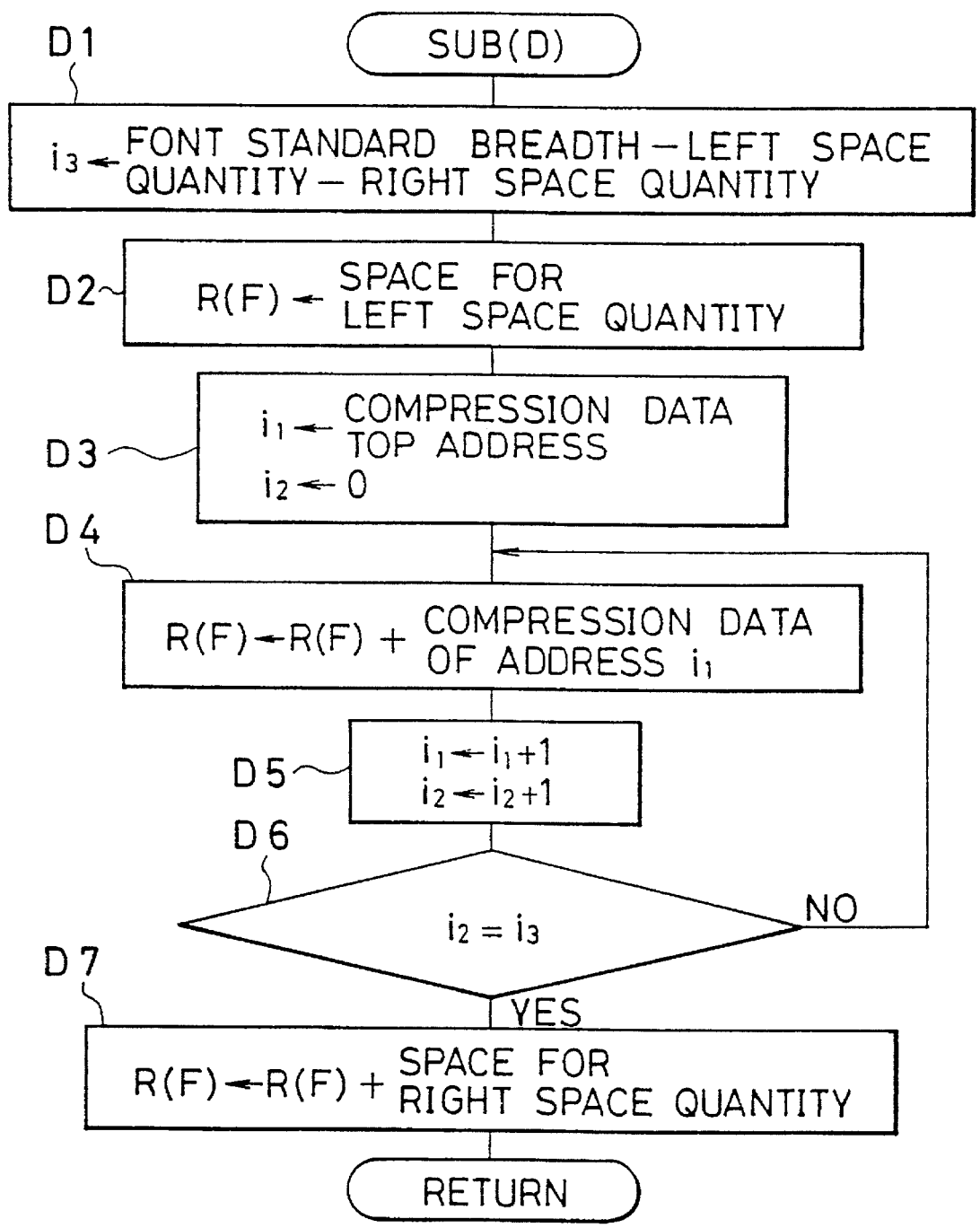

If a value from the seventh bit to the fourth bit of the compression information 1 turns out to be 1000 in step S3 of font pattern regenerative processing, this implies the font pattern to which the regenerative rule of right-and-left compression is applicable. A subprogram (D) shown in FIG. 10 is executed.

No retention data quantity is given to the font data prepared in conformity with the regenerative rule of right-and-left compression. For this reason, the microprocessor 2, at the first onset, subtracts the right and left space quantities given based on the compression information 2 from the value of the font standard breadth read in step S2 of font pattern regenerative processing. A virtual retention data quantity $i_3$ (step D1) is thus calculated. Thereafter, the space columns corresponding to the left space quantity given based on the compression information 2 are set in the font pattern register R(F) (step D2).

In an example shown in FIG. 20, a value of the left space quantity is 4. Hence, a left space for 4 columns is at first set in the font pattern register R(F).

Subsequently, all the columns of the bit patterns stored as compression data set in the font pattern register R(F) in accordance with the processes of steps D3–D6 equivalent to steps C1–C4 of FIG. 9. A different point from FIG. 9 is, however, that a value of the counter $i_2$ is compared with the virtual retention data quantity $i_3$ calculated in step D1.

In an example shown in FIG. 20, the left space quantity is 4, while the right space quantity is 6. A value of the virtual retention data quantity $i_3$ is therefore 2. Based on a value of the index $i_1$ in which the top address of the compression data is set as an initial value, the bit patterns of the first and second columns of the compression data are set in the font pattern register R(F).

The microprocessor 2, after completing the processes assuming a loop configured by steps D4–D6, moves to step D7. Space columns corresponding to the right space quantity given based on the compression information 2 are set in the font pattern register R(F).

In an example depicted in FIG. 20, a value of the right space quantity is 6. Hence, the right space for 6 columns is set in the font pattern register R(F). The 12-row/12-column font patterns are completed on the whole.

Figure 11:
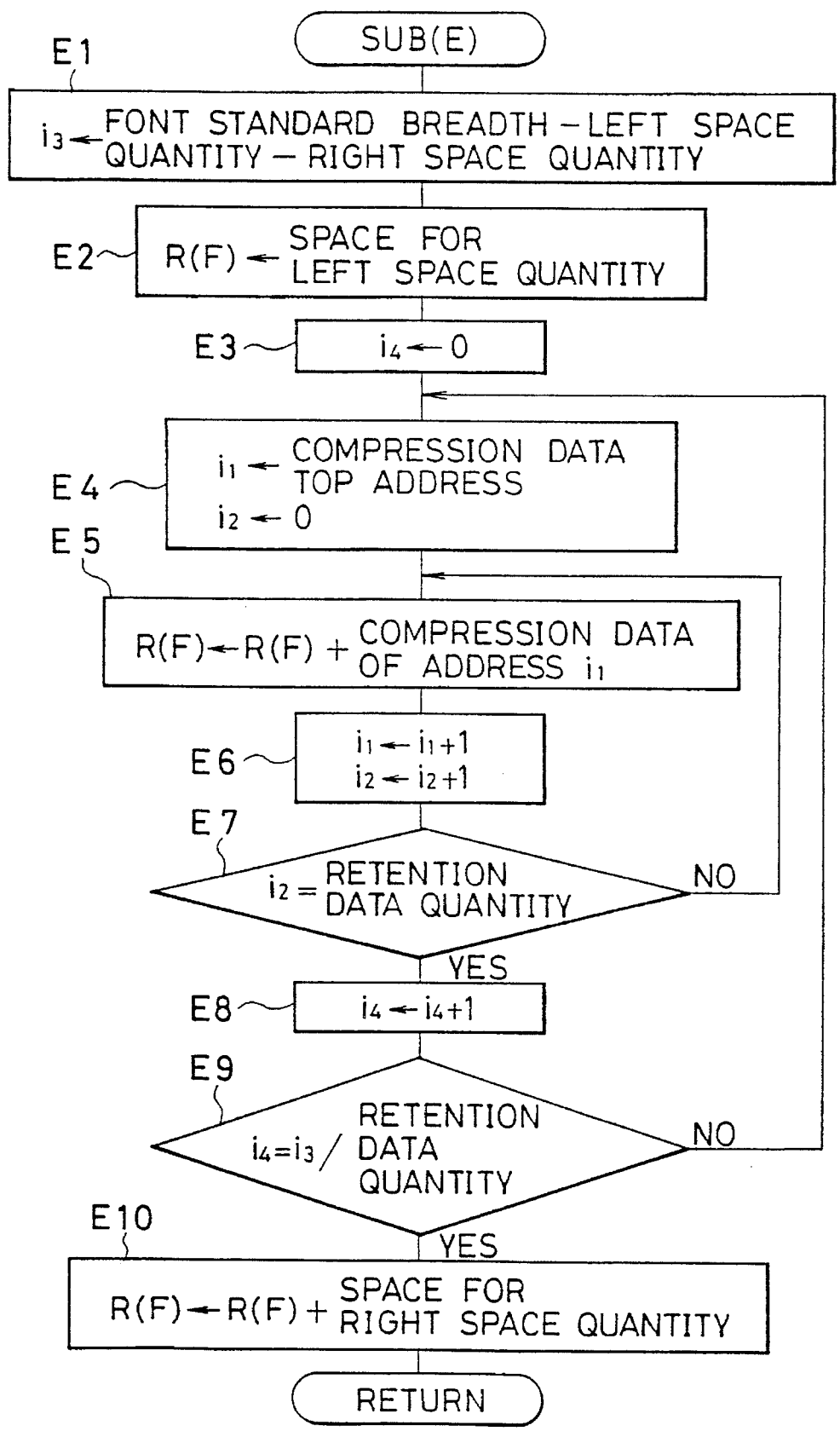

If a value from the seventh bit to the fourth bit of the compression information 1 turns out to be 1001 in step S3 of font pattern regenerative processing, this implies the font pattern to which the regenerative rule of inter right-and-left compression repetition is applicable. A subprogram (E) illustrated in FIG. 11 is executed.

The microprocessor 2, at the first onset, subtracts the right and left space quantities given based on the compression information 2 from a value of the font standard breadth reading step S2 of font pattern regenerative processing. Calculated is an inter data quantity $i_3$ defined as a bit width of a repetitive portion sandwiched in between the left space and the right space (step E1). After this step, space columns corresponding to the left space given based on the compression information 2 are set in the font pattern register R(F) (step E2).

In an example shown in FIG. 21, a value of the left space quantity is 3. Therefore, the left space for 3 columns is at first set in the font pattern register R(F).

Subsequently, the initial value 0 is set in the output number storage counter $i_4$ (step E3). The processes of steps E4–E9 equivalent to steps B2–B7 of FIG. 8 are repeatedly executed. A different point from FIG. 8 is, however, that a value of the counter $i_4$ is compared with the value obtained by dividing the inter data quantity $i_3$ by the retention data quantity.

In an example illustrated in FIG. 21, a value of the retention data quantity is 1. Hence, the processes assuming a small loop configured by steps E5–E6 are executed once. The output number storage counter $i_4$ is incremented every time the bit patterns indicated by the value of the index $i_1$ with the top address of the compression data serving as an initial value are set once in the font pattern register R(F). A value obtained by dividing the inter data quantity $i_3$ by the retention data quantity is expressed such as (12–3"4)/1=5. The processes assuming a large loop configured by steps E4–E9 are therefore executed five times. For this reason, in an example of FIG. 21, only the first column bit pattern of the compression data is repeatedly set five times in the font pattern register R(F).

The microprocessor 21, after completing the processes assuming the large loop configured by steps E4–E9, moves to step E10. Space columns corresponding to the right space quantity given based on the compression information 2 are set in the font pattern register R(F).

In an example of FIG. 21, a value of the right space quantity is 4. Therefore, the right space for 4 columns is set in the font pattern register R(F), whereby the 12-row/12-column font patterns are completed on the whole.

Figure 12:
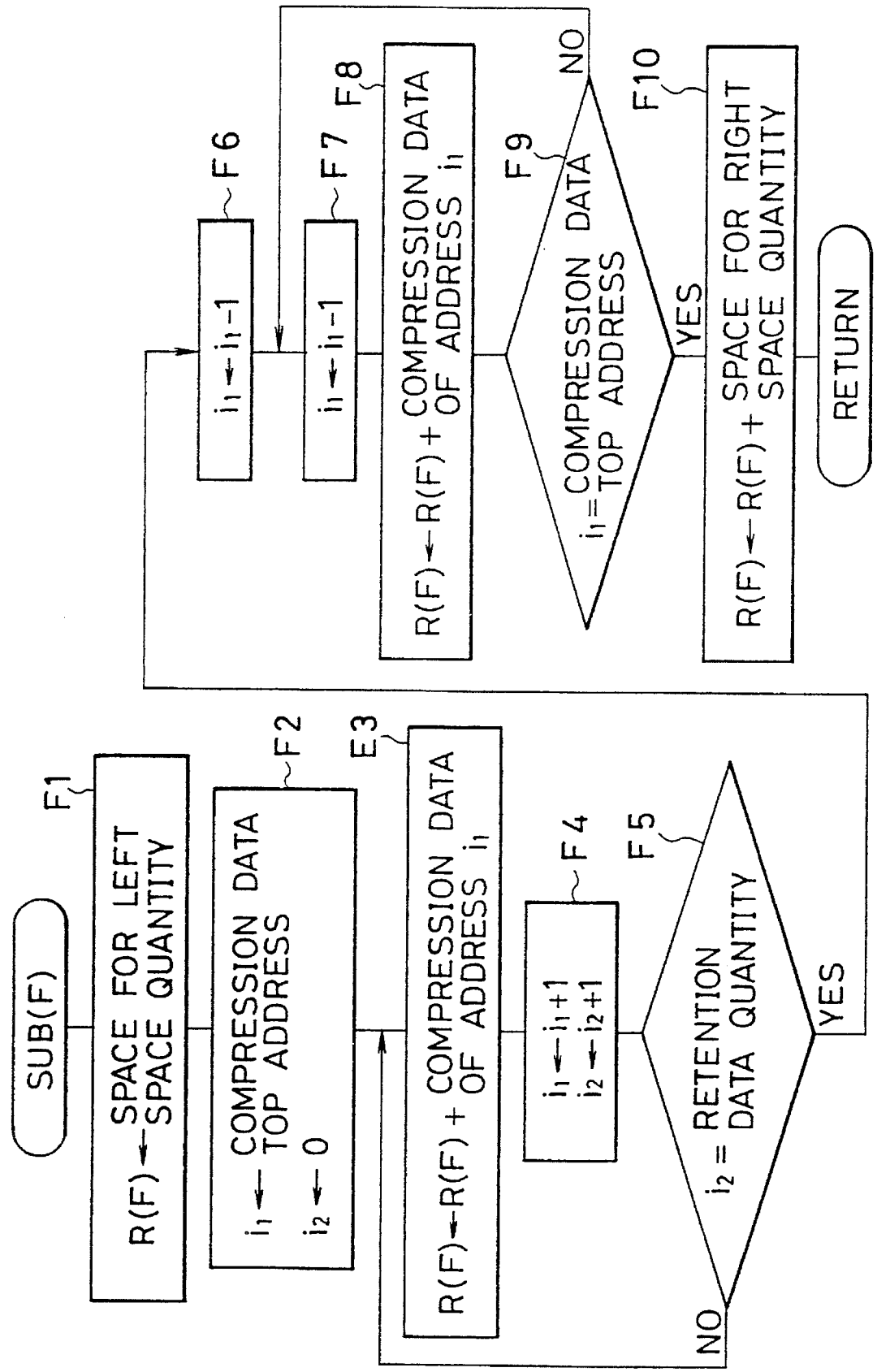

When a value from the seventh bit to the fourth bit of the compression information 1 turns out to be 1010 in step S3 of font pattern regenerative processing, this implies the font pattern to which the regenerative rule of inter right-and-left compression mirror is applicable. A subprogram (F) shown in FIG. 12 is executed.

To start with, the microprocessor 2 sets, in the font pattern register R(F), the space columns corresponding to the left space quantity given based on the compression information 2 (step F1).

In an example depicted in FIG. 22, a value of the left space quantity is 2, so that the left space for 2 columns is at first set in the font pattern register R(F).

Subsequently, the processes of steps F2–F9 equivalent to steps C1–C8 of FIG. 9 are executed. The respective bit patterns constituting individual columns of the compression data are outputted by one circulation in forward and reverse directions and then set in the font pattern register R(F).

In the example of FIG. 22, a value of the retention data quantity is 3. Hence, the bit patterns constituting the first through third columns and also the second and first columns of the compression data are sequentially set in the font pattern register R(F).

Subsequently, the microprocessor 2 moves to step F10, wherein space columns corresponding to the right space quantity given based on the compression information 2 are set in the font pattern register R(F).

In the example of FIG. 22, a value of the right space quantity is 5, and hence the right space for 5 columns is set in the font pattern register R(F). The 12-row/12-column font patterns are completed on the whole.

When a value from the seventh bit to the fourth bit of the compression information 1 turns out to be 1100 in step S3 of font pattern regenerative processing, this implies the font pattern to which the regenerative rule of inter right-and-left linkage compression is applicable. A subprogram (G) shown in FIG. 13 is executed.

The microprocessor 2 initially executes the processes of steps G1–G4 equivalent to steps A1–A4 of FIG. 8 but does not increment the value of the index $i_1$ in step G3. In step G4, a value of the counter $i_2$ is compared with the left space quantity given based on the compression information 2, i.e., the repetitive quantity of the first column bit pattern in the compression data. Therefore, the first column bit pattern of the compression data is set, with repetitions corresponding to the left space quantity, in the font pattern register R(F).

In an example of FIG. 23, a value of the left space quantity is 3, and it follows that the first column bit pattern of the compression data is set in three lines. In this example, the first column bit pattern of the compression data consists of a space column.

Next, the microprocessor 2 initializes a value of the counter $i_2$ (step G5). The microprocessor 2 subtracts the right and left space quantities given based on the compression information 2 from a value of the font standard breadth read in step S2 of font pattern regenerative processing. A virtual retention data quantity $i_3$ is thus calculated (step G6). The microprocessor 2 sets the bit patterns of respective columns of the compression data indicated by the index $i_1$ sequentially in the font pattern register R(F) (steps G7–G9) till a value of the counter $i_2$ reaches $i_3$ while incrementing the values of the index $i_1$ and of the counter $i_2$.

In the example shown in FIG. 23, a value obtained by subtracting the right and left space quantities from the font standard breadth is expressed such as 12–3–6=3. Set in the font pattern register R(F) are all the bit patterns of the first through third columns of the compression data, which constitute, i.e., the compression data.

Subsequently, the microprocessor 2 initializes the value of the counter $i_2$. The microprocessor 2 then decrements the final value of the index $i_1$ to make it coincident with an address value indicating the last bit pattern of the compression data (step G10). The microprocessor 2 executes the processes of steps G11–G13 equivalent to steps G2–G4. In this case, a value of the counter $i_2$ is compared with the right space quantity given based on the compression information 2, i.e., with the repetitive quantity of the last bit pattern in the compression data. As a result, the last bit pattern constituting the compression data is set, with repetitions corresponding to the right space quantity, in the font pattern register R(F).

In the example illustrated in FIG. 23, a value of the right space quantity is 6. It follows that the last bit pattern in the compression data, viz., the third column bit pattern of the compression data is repeatedly set six times in the font pattern register R(F).

Figure 14:
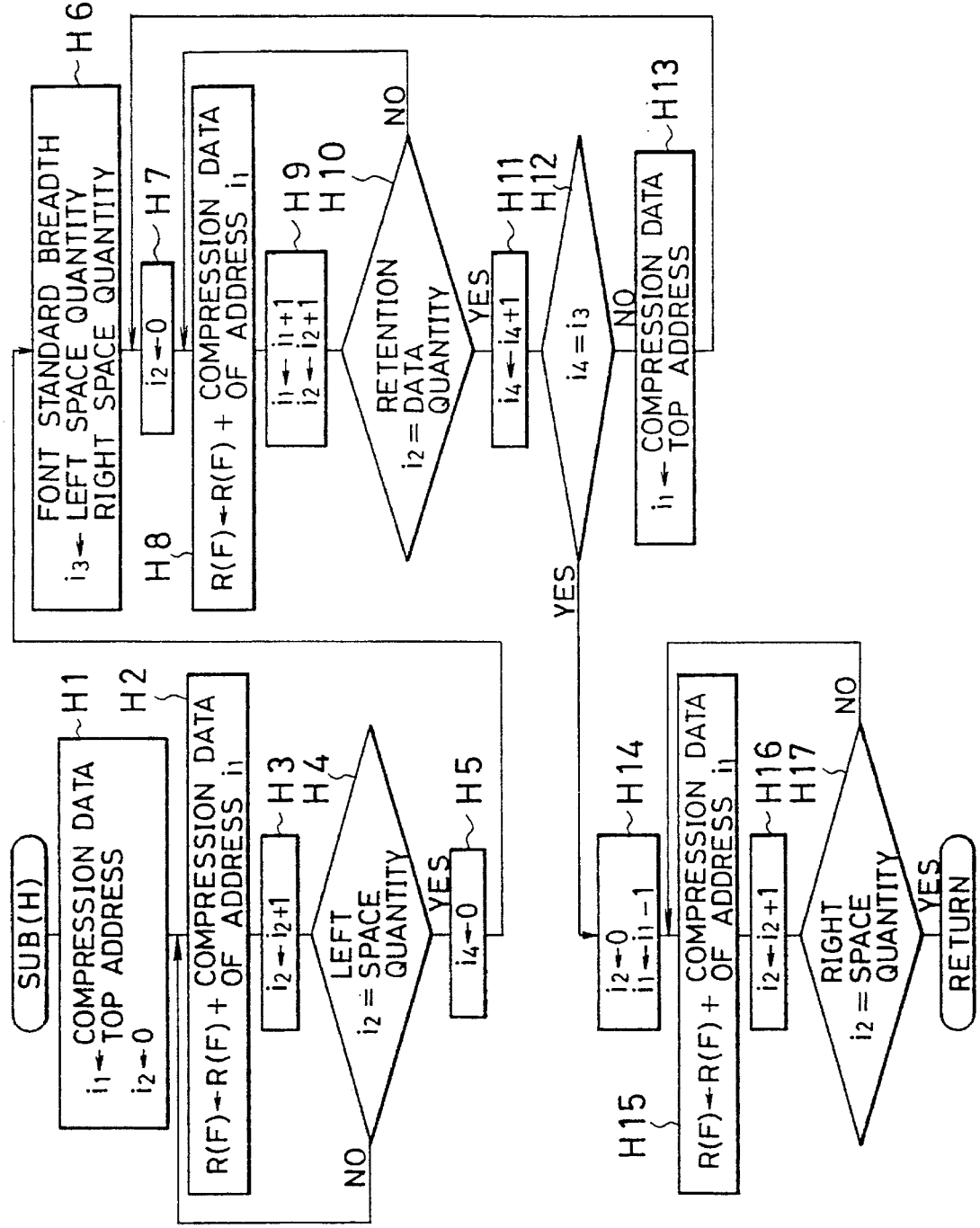

If a value from the seventh bit to the fourth bit of the compression information 1 turns out to be 1101 in step S3 of font pattern regenerative processing, this implies the font pattern to which the regenerative rule of inter right-and-left linkage compression repetition is applicable. A subprogram (H) shown in FIG. 14 is executed.

The microprocessor 2 initially sets the first column bit pattern in the compression data, with repetitions corresponding to the left space quantity, in the font pattern register R(F) in accordance with the processes of steps H1–H4 equivalent to steps G1–G4 of FIG. 13.

In an example depicted in FIG. 24, a value of the left space quantity is 3, so that the first bit pattern of the compression data is set in three lines.

Subsequently, the microprocessor 2 initializes a value of the output number storage counter $i_4$ (step H5). The microprocessor 2 subtracts the right and left space quantities given based on the compression information 2 from a value of the font standard breadth, thereby calculating an inter data quantity. The inter data quantity is divided by a retention data quantity given based on the compression information 1, thereby calculating a repetitive output number $i_3$ (step H6).

In the example shown in FIG. 24, a value of the repetitive output number $i_3$ is given such as (12−3−6) /3=1.

Next, the microprocessor 2 sets the initial value 0 in the counter $i_2$ (step H7). The microprocessor 2 sequentially sets, in the font pattern register R(F), the bit patterns of the respective columns of the compression data indicated by the index $i_1$ till a value of the counter $i_2$ reaches a value of the retention data quantity while incrementing the values of the index $i_1$ and of the counter $i_2$. This setting is based on the processes of steps H8–H10 equivalent to steps B3–B5 of FIG. 8.

In the example illustrated in FIG. 24, a value of the retention data quantity is 3. Set in the font pattern register R(F) are the first to third column bit patterns, viz., all the bit patterns of the individual columns which constitute the compression data.

In this way, all the bit patterns of the respective columns which constitute the compression data are set in the font pattern register R(F). Thereafter, the microprocessor 2 increments a value of the output number storage counter $i_4$ (step H11). Made is a judgment as to whether or not the value of the output number storage counter $i_4$ reaches a value of the repetitive output number $i_3$ calculated in step H6 (step H12). If not, the top address of the compression data is reset in the index $i_1$, and the operation returns to step H7 (step H13). The processes of steps H8–H10 are executed as in the same way as above. All the bit patterns of the respective columns which constitute the compression data are set, with repetitions indicated by the repetitive output number $i_3$, in the font pattern register R(F).

In the example depicted in FIG. 24, a value of the repetitive output number $i_3$ is 1, and hence all the bit patterns of the individual columns which constitute the compression data are set once in the font pattern register R(F).

Subsequently, the microprocessor 2 sets the initial value 0 in the counter $i_2$. The microprocessor 2 decrements a value of the index $i_1$ to make it coincident with an address value indicating the last bit pattern of the compression data (step H14). The last bit pattern in the compression data is set, with repetitions corresponding to a value of the right space quantity, in the font pattern register R(F). This setting is based on the processes of steps H15–H17 equivalent to steps H2–H4.

In the example shown in FIG. 24, a value of the right space quantity is 6, so that the last bit pattern in the compression data is set in six lines. The 12-row/12-column font patterns are regenerated on the whole.

If a value from the seventh bit to the fourth bit of the compression information 1 turns out to be 1110 in step S3 of font pattern regenerative processing, this implies the font pattern to which the regenerative rule of inter right-and-left linkage compression mirror is applicable. A subprogram (I) illustrated in FIG. 15 is executed.

To begin with, the microprocessor 2 sets the first column bit pattern in the compression data, with repetitions corresponding to a value of the left space quantity, in the font pattern register R(F). This setting is based on the processes of steps I1–I4 equivalent to steps H1–H4 of FIG. 14.

In an example shown in FIG. 25, a value of the left space quantity is 1, so that the first column bit pattern of the compression data is set in only one line.

Next, the initial value 0 is set in the counter $i_2$ (step I5). The bit patterns constituting the respective columns of the compression data are outputted by one circulations in the forward and reverse directions in accordance with the processes of steps I6–I12 equivalent to steps F3–F9 of FIG. 12. Those bit patterns are then set in the font pattern register R(F).

In the example shown in FIG. 25, a value of the retention data quantity is 4. Hence, the bit patterns constituting the first through fourth columns and the third through first columns of the compression data are sequentially set in the font pattern register R(F).

Next, the microprocessor 2 sets the initial value 0 in the counter $i_2$ (step I13). The first column bit pattern in the compression data—i.e., the bit pattern identical with the last one of the bit patterns formed of the mirror image of the compression data—is set in the font pattern register R(F) with repetitions corresponding to a value of the right space quantity. This setting is based on the processes of steps I14–I16 equivalent to steps I15–I17 of FIG. 14.

In the example of FIG. 25, a value of the right space quantity is 5. Therefore, it follows that the first column bit pattern of the compression data which is identical with the last one of the bit patterns formed of the mirror image of the compression data is set in four lines.

If a value from the seventh bit to the fourth bit of the compression information 1 turns out to be 1111 in step S3 of font pattern regenerative processing, this implies the space for one character. Space columns for the font standard breadth are set in the font pattern register R(F) in accordance with a subprogram (J) shown in FIG. 16.

The font patterns regenerated in the font pattern register R(F) on the basis of those subprograms are sequentially stored in the image memory unit of the data storage RAM 5 in step S5 of font pattern regenerative processing. The font patterns are outputted as letters or graphic characters or a train of character to the CRT display unit 7 or the printer 8 by proper processing.

Although the illustrative embodiment of the present invention have been described in detail with reference to the accompanying drawings, it is to be understood that the present invention is not limited to the embodiment. Various changes or modifications may be effected therein by one skilled in the art without departing from the scope or spirit of the invention.

What is claimed is:

1. A font data compressing method in a character generator, comprising the steps of:

(a) defining a plurality of regeneration rules for a plurality of font patterns;

(b) selecting a specific regeneration rule to be applied to a font pattern to be compressed from said regeneration rules defined in step (a) and storing said specific regeneration rule in said character generator, said specific regeneration rule being in one-to-one relation to the font pattern to be compressed;

(c) storing a bit formation for forming a part of dot matrix data representing a whole configuration of said font pattern in accordance with said specific regeneration rule selected in step (b), said bit formation representing at least one column of said dot matrix data; and (d) automatically regenerating said dot matrix data representing the whole configuration of said font pattern based on said bit formation stored in step (c) and said specific regeneration rule selected and stored in said character generator in step (b), wherein said bit formation comprises specific bit patterns adjacent to each other in said dot matrix, said font pattern to be compressed is formed by said bit formation and a mirror image of said bit formation, and said dot matrix data is regenerated in said step (d) by outputting first said specific bit patterns of said bit formation and then bit patterns corresponding to the mirror image of said bit formation obtained with the last bit pattern of said bit formation serving as an axis of symmetry.

2. A font data compressing method in a character generator, comprising the steps of:

(a) defining a plurality of regeneration rules for a plurality of font patterns;

(b) selecting a specific regeneration rule to be applied to a font pattern to be compressed from said regeneration rules defined in step (a) and storing said specific regeneration rule in said character generator, said specific regeneration rule being in one-to-one relation to the font pattern to be compressed;

(c) storing a bit formation for forming a part of dot matrix data representing a whole configuration of said font pattern in accordance with said specific regeneration rule selected in step (b), said bit formation representing at least one column of said dot matrix data; and (d) automatically regenerating said dot matrix data representing the whole configuration of said font pattern based on said bit formation stored in step (c) and said specific regeneration rule selected and stored in said character generator in step (b), wherein said bit formation comprises specific bit patterns adjacent to each other in said dot matrix, said font pattern to be compressed is formed by said bit formation with right and left spaces, said step (c) further comprises a step of storing data indicating quantities of right and left spaces, and said dot matrix data is regenerated in said step (d) by outputting said specific bit patterns of said bit formation with spaces in accordance with said right and left space quantities.

3. A font data compressing method in a character generator, comprising the steps of:

(a) defining a plurality of regeneration rules for a plurality of font patterns;

(b) selecting a specific regeneration rule to be applied to a font pattern to be compressed from said regeneration rules defined in step (a) and storing said specific regeneration rule in said character generator, said specific regeneration rule being in one-to-one relation to the font pattern to be compressed;

(c) storing a bit formation for forming a part of dot matrix data representing a whole configuration of said font pattern in accordance with said specific regeneration rule selected in step (b), said bit formation representing at least one column of said dot matrix data; and (d) automatically regenerating said dot matrix data representing the whole configuration of said font pattern based on said bit formation stored in step (c) and said specific regeneration rule selected and stored in said character generator in step (b), wherein said bit formation comprises specific bit patterns adjacent to each other in said dot matrix, said font pattern to be compressed is formed by repetitions of said bit formation with right and left spaces, said step (c) further comprises a step of string data indicating quantities of right and left spaces, and said dot matrix data is regenerated in said step (d) by repeatedly outputting said specific bit patterns of said bit formation with spaces corresponding to said right and left space quantities.

4. A font data compressing method in a character generator, comprising the steps of:

(a) defining a plurality of regeneration rules for a plurality of font patterns;

(b) selecting a specific regeneration rule to be applied to a font pattern to be compressed from said regeneration rules defined in step (a) and storing said specific regeneration rule in said character generator, said specific regeneration rule being in one-to-one relation to the font pattern to be compressed;

(c) storing a bit formation for forming a part of dot matrix data representing a whole configuration of said font pattern in accordance with said specific regeneration rule selected in step (b), said bit formation representing at least one column of said dot matrix data; and (d) automatically regenerating said dot matrix data representing the whole configuration of said font pattern based on said bit formation stored in step (c) and said specific regeneration rule selected and stored in said character generator in step (b), wherein said bit formation comprises specific bit patterns adjacent to each other in said dot matrix, said font pattern to be compressed is formed by said bit formation and a mirror image of said bit formation with right and left spaces, said step (c) further comprises a step of storing data indicating quantities of right and left spaces, and said dot matrix data is regenerated in said step (d) by outputting first said specific bit patterns of said bit formation and then bit patterns corresponding to the mirror image of said bit formation obtained with the last bit pattern of said bit formation serving as an axis of symmetry, with spaces in accordance with said right and left spaces quantities.

5. A font data compressing method in a character generator, comprising the steps of:

(a) defining a plurality of regeneration rules for a plurality of font patterns;

(b) selecting a specific regeneration rule to be applied to a font pattern to be compressed from said regeneration rules defined in step (a) and storing said specific regeneration rule in said character generator, said specific regeneration rule being in one-to-one relation to the font pattern to be compressed;

(c) storing a bit formation for forming a part of dot matrix data representing a whole configuration of said font pattern in accordance with said specific regeneration rule selected in step (b), said bit formation representing at least one column of said dot matrix data; and (d) automatically regenerating said dot matrix data representing the whole configuration of said font pattern based on said bit formation stored in step (c) and said specific regeneration rule selected and stored in said character generator in step (b), wherein said bit formation comprises specific bit patterns adjacent to each other in said dot matrix, said font pattern to be compressed is formed by said bit formation and repetitions of a first bit pattern and a last bit pattern of said bit formation, said step (c) further comprises a step of storing data indicating quantities for repeating said first bit pattern and said last bit pattern, and said dot matrix data is regenerated in said step (d) by outputting said specific bit patterns of said bit formation and repeatedly outputting said first bit pattern and said last bit pattern in accordance with said repetition quantities.

6. A font data compressing method in a character generator, comprising the steps of:

(a) defining a plurality of regeneration rules for a plurality of font patterns;

(b) selecting a specific regeneration rule to be applied to a font pattern to be compressed from said regeneration rules defined in step (a) and storing said specific regeneration rule in said character generator, said specific regeneration rule being in one-to-one relation to the font pattern to be compressed;

(c) storing a bit formation for forming a part of dot matrix data representing a whole configuration of said font pattern in accordance with said specific regeneration rule selected in step (b), said bit formation representing at least one column of said dot matrix data; and (d) automatically regenerating said dot matrix data representing the whole configuration of said font pattern based on said bit formation stored in step (c) and said specific regeneration rule selected and stored in said character generator in step (b), wherein said bit formation comprises specific bit patterns adjacent to each other in said dot matrix, said font pattern to be compressed is formed by repetitions of said bit formation and repetitions of a first bit pattern and a last bit pattern of said bit formation, said step (c) further comprises a step of storing data indicating quantities for repeating said first bit pattern and said last bit pattern, and said dot matrix data is regenerated in said step (d) by repeatedly outputting said specific bit patterns of said bit formation and repeatedly outputting said first bit pattern and said last bit pattern in accordance with said repetition quantities.

7. A font data compressing method in a character generator, comprising the steps of:

(a) defining a plurality of regeneration rules for a plurality of font patterns;

(b) selecting a specific regeneration rule to be applied to a font pattern to be compressed from said regeneration rules defined in step (a) and storing said specific regeneration rule in said character generator, said specific regeneration rule being in one-to-one relation to the font pattern to be compressed;

(c) storing a bit formation for forming a part of dot matrix data representing a whole configuration of said font pattern in accordance with said specific regeneration rule selected in step (b), said bit formation representing at least one column of said dot matrix data; and (d) automatically regenerating said dot matrix data representing the whole configuration of said font pattern based on said bit formation stored in step (c) and said specific regeneration rule selected and stored in said character generator in step (b), wherein said bit formation comprises specific bit patterns adjacent to each other in said dot matrix, said font pattern to be compressed is formed by said bit formation, a mirror image of said bit formation and repetitions of a first bit pattern and a last bit pattern of said bit formation, said step (c) further comprises a step of storing data indicating quantities for repeating said first bit pattern and said last bit pattern, and said dot matrix data is regenerated in said step (d) by outputting said specific bit patterns of said bit formation, then bit patterns corresponding to the mirror image of said bit formation obtained with said last bit pattern serving as an axis of symmetry, and repeatedly outputting said first bit pattern and said last bit pattern in accordance with said repetition quantities.

* * * * *